July 23, 1957 W. H. BLASHFIELD ET AL 2,800,532

AUTOMATIC TELEPHONE SYSTEM

Filed April 26, 1954 8 Sheets-Sheet 1

INVENTORS.
WILLIAM H. BLASHFIELD
BEN A. HARRIS
BY Brown, Jackson, Boettcher & Dienner
ATTYS.

July 23, 1957 W. H. BLASHFIELD ET AL 2,800,532

AUTOMATIC TELEPHONE SYSTEM

Filed April 26, 1954 8 Sheets-Sheet 2

INVENTORS.
WILLIAM H. BLASHFIELD
BEN A. HARRIS
BY
Brown, Jackson, Boettcher & Dienner
ATTYS.

INVENTORS.
WILLIAM H. BLASHFIELD
BEN A. HARRIS
BY
Brown, Jackson, Boettcher & Dienner
ATTYS.

INVENTORS.
WILLIAM H. BLASHFIELD
BEN A. HARRIS
BY Brown, Jackson
Boettcher & Dienner
ATTYS.

INVENTORS.
WILLIAM H. BLASHFIELD
BEN A. HARRIS
BY Brown, Jackson,
Boettcher & Dienner
ATTYS.

July 23, 1957 W. H. BLASHFIELD ET AL 2,800,532

AUTOMATIC TELEPHONE SYSTEM

Filed April 26, 1954 8 Sheets-Sheet 6

INVENTOR.
WILLIAM H. BLASHFIELD
BEN A. HARRIS
BY Brown, Jackson, Boettcher & Dienner
ATTYS.

AUTOMATIC TELEPHONE SYSTEM

INVENTORS.
WILLIAM H. BLASHFIELD
BEN A. HARRIS
BY Brown, Jackson, Boettcher & Dienner
ATTYS.

INVENTORS.
WILLIAM H. BLASHFIELD
BEN A. HARRIS
BY
Brown, Jackson, Boettcher & Dienner
ATTYS.

United States Patent Office 2,800,532

Patented July 23, 1957

2,800,532

AUTOMATIC TELEPHONE SYSTEM

William H. Blashfield, Galion, Ohio, and Ben A. Harris, Rochester, N. Y., assignors to North Electric Company, a corporation of Ohio Application April 26, 1954, Serial No. 425,364

31 Claims. (Cl. 179—18)

Figure 1:
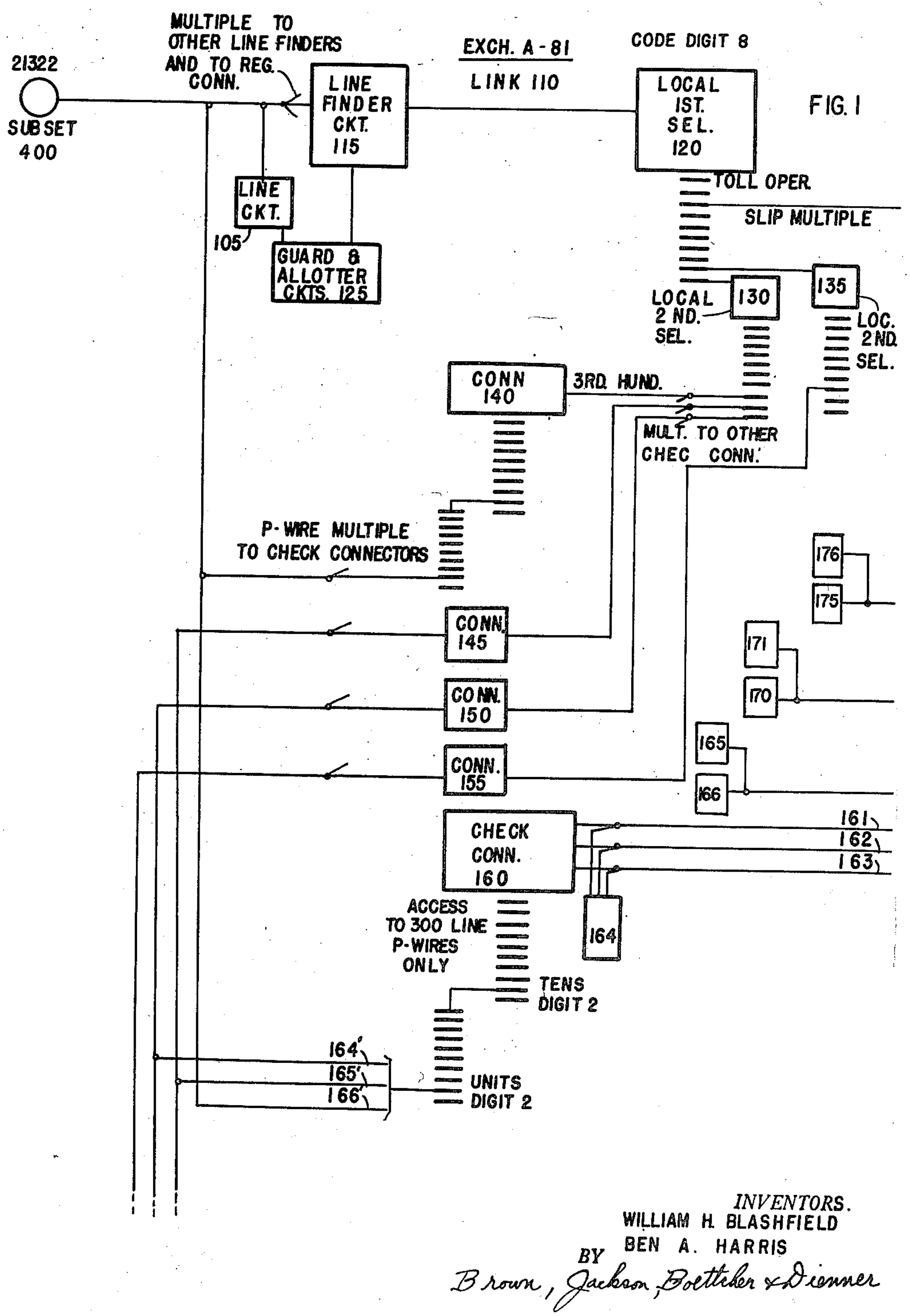

The present invention relates in general to automatic telephone systems, and in particular, to toll ticketing equipment for use therewith.

The utilization of automatic toll ticketing equipment to provide complete and accurate records of calls established over automatic telephone exchanges has proven extremely successful, and the more extensive application thereof has been restricted only by the somewhat excessive installation costs which are experienced in the use of many known types of ticketing systems. These costs are especially impractical in the case of automatic and manual exchanges which are of the short haul-low density type.

There has been set forth in a copending application which was filed by Blashfield et al. on July 23, 1951, and received Serial No. 238,092, and in an application which was filed by Blashfield et al. on July 15, 1953, and received Serial No. 368,066, arrangements which by reason of their inherently low installation costs permit the ready inclusion thereof in most types of exchanges, and especially in exchanges which are confronted with the problems incident to short haul-low density traffic loads.

Basic to the minimization of installations and maintenance costs in these arrangements is the provision of equipment which records the calling party number as dialled by the calling party, and which verifies the calling number thus dialled prior to further extending of the connection thereby. The delegation of subscriber identification to the calling subscriber in this manner eliminates a large amount of expensive automatic party and line identification equipment which is common to many types of exchanges, and the overall cost of the apparatus is reduced by corresponding amounts. Other features and advantages of the arrangements there disclosed include the use of an economical type punch magnet and step magnet in each recorder to provide a perforated tape record of each call. In this manner complicated translating and storage equipment is eliminated and a more economical type system is accomplished.

It is the purpose of the present invention to provide an improved type identification system for use with exchanges wherein the calling party dials his own number prior to dialling of the called party number. A specific object of this invention is to provide a new and novel checking system which utilizes a reduced amount of equipment for accomplishing calling directory number identification and calling line verification.

Briefly, in systems known heretofore wherein the calling party identifies himself by dialling his directory number, the checking equipment is operative to verify the calling party number as dialled by extending a connection over local switching equipment back to the calling line while simultaneously recording same on the tape equipment. If the calling party correctly dials his own number, a connection will be completed to his own line simultaneously with the recording of the calling directory number on the tape. As the last digit of the calling number is dialled, special equipment determines whether or not the connection has been completed to the calling subscriber line. If the number has been dialled inaccurately, the equipment terminates the call and busy tone is returned to the subscriber.

There have been several basic systems for accomplishing extension of a connection back to the calling line. One arrangement utilizes special switching links which include check connectors wherein two conductors are switched incoming to the check connector from the prior stage selector, and the check connector in turn extends a single conductor outgoing to the calling line. A second known arrangement eliminates the utilization of special check connectors by modifying regular switching links to extend connection to a calling line, and thus eliminate a certain amount of special equipment. However, the same general arrangement wherein a plurality of conductors are switched through the various preliminary stages of the switching equipment to the connector are still required. It is apparent therefrom that in the switching of at least three conductors for each line through a conventional one hundred line switch, only one hundred lines could be extended through each of the checking switches.

The present invention has as a specific object thereof the provision of a switching arrangement wherein a conventional one hundred line switch is adapted to effect the establishment of checking connections to an increased number of subscriber lines, and specifically, as shown in one embodiment herein, to extend checking connections to at least three hundred subscriber lines.

As shown hereinafter, the special switching equipment involving check selectors and check connectors are utilized to establish the check connections to the calling lines. However, the check connection established by these switches comprises the extension of a single lead incoming to the check connector and the extension of this same single lead outgoing from the check connector to the calling line.

In conventional switching arrangements, a connector switch must perform the three normal functions, which include (*a*) busy test; (*b*) seizure; and (*c*) dialling. In installations having certain types of toll ticketing equipment, the connector switch must also be operative to accomplish a calling-loop tone test. It is a specific object of the present invention to provide a check connector which is seized over a single lead and extends a single lead over the outgoing side thereof to the desired subscriber and which is operative over the single conductor to perform the four functions performed by the connector switches used in toll ticketing arrangements of the described type.

In the provision of a connector switch which is operative in this manner, an incoming path is provided for each one hundred subscribers served thereby, the particular path over which the connector is seized being effective to determine the one hundred group of the desired subscriber line. That is, the connector is operated responsive to the receipt of the tens and units digit designation to select the three lines of the three hundred lines which have these tens and units numbers assigned thereto, and the particular path over which the connector was seized determines which one of the three lines is to be selected.

Figure 2:
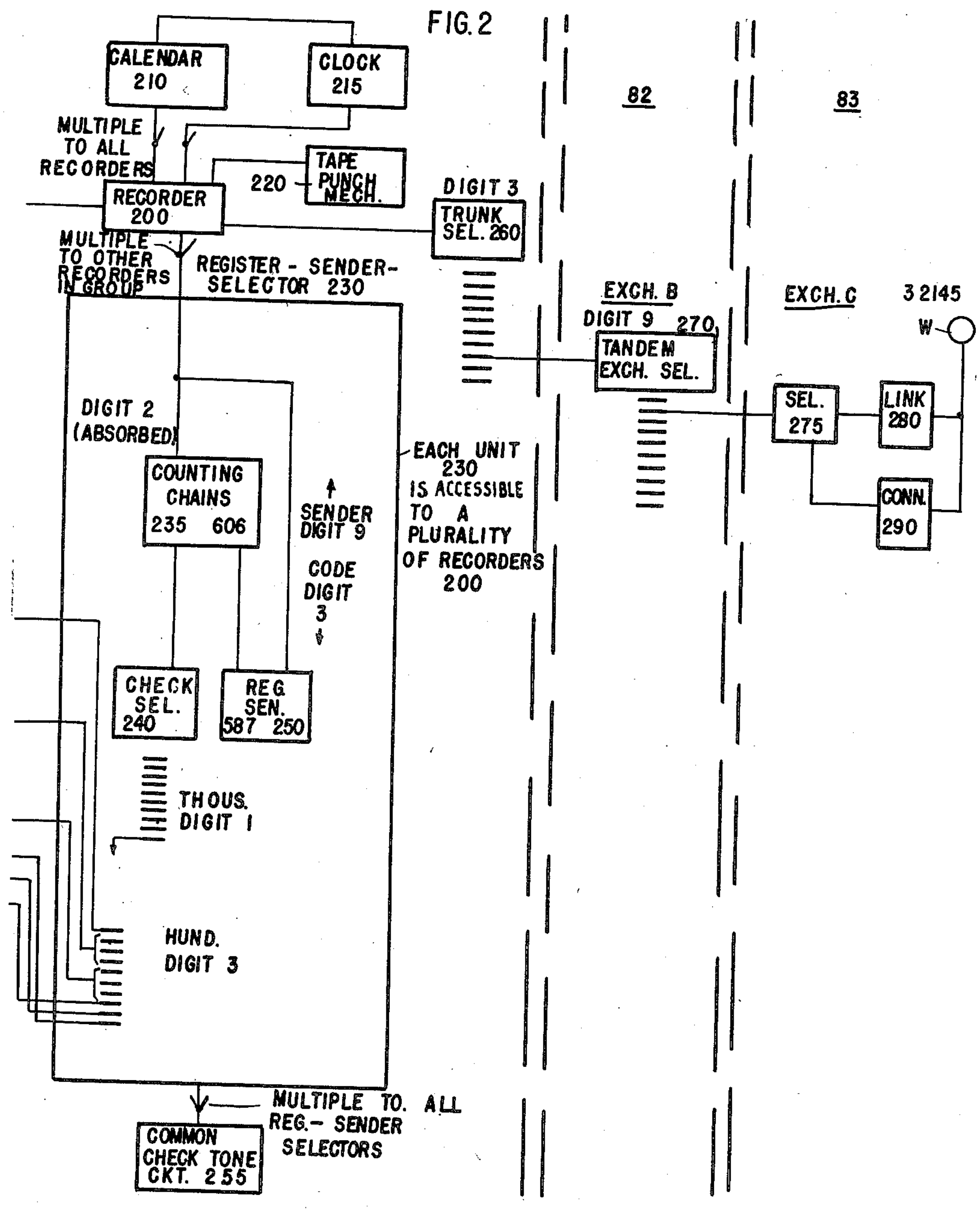
Figure 3:
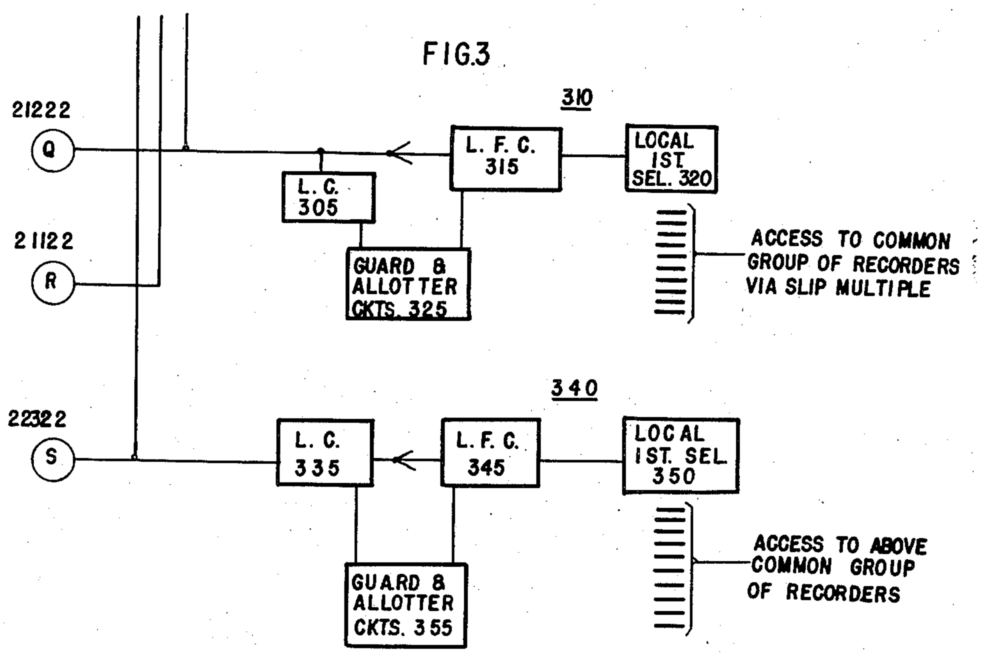
Figure 8:
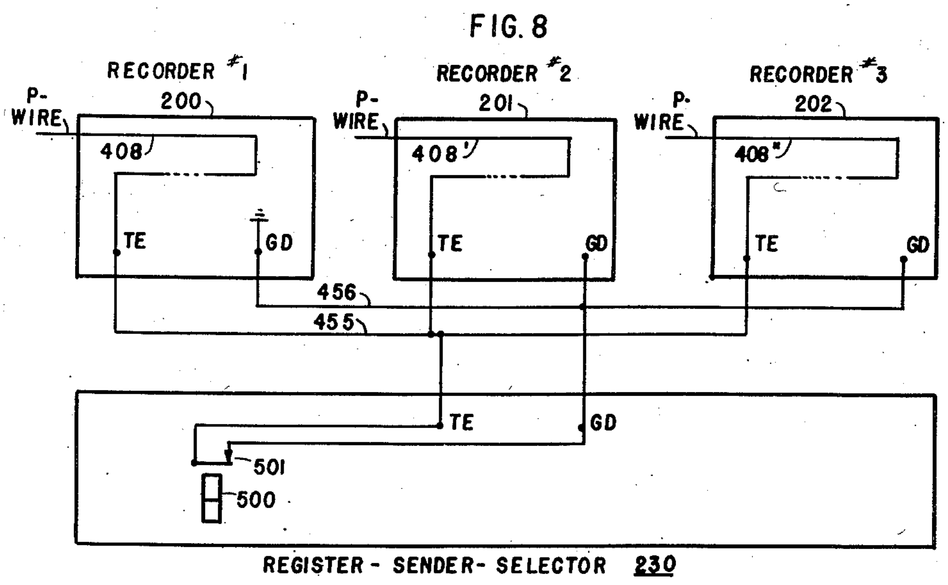
Figure 4:
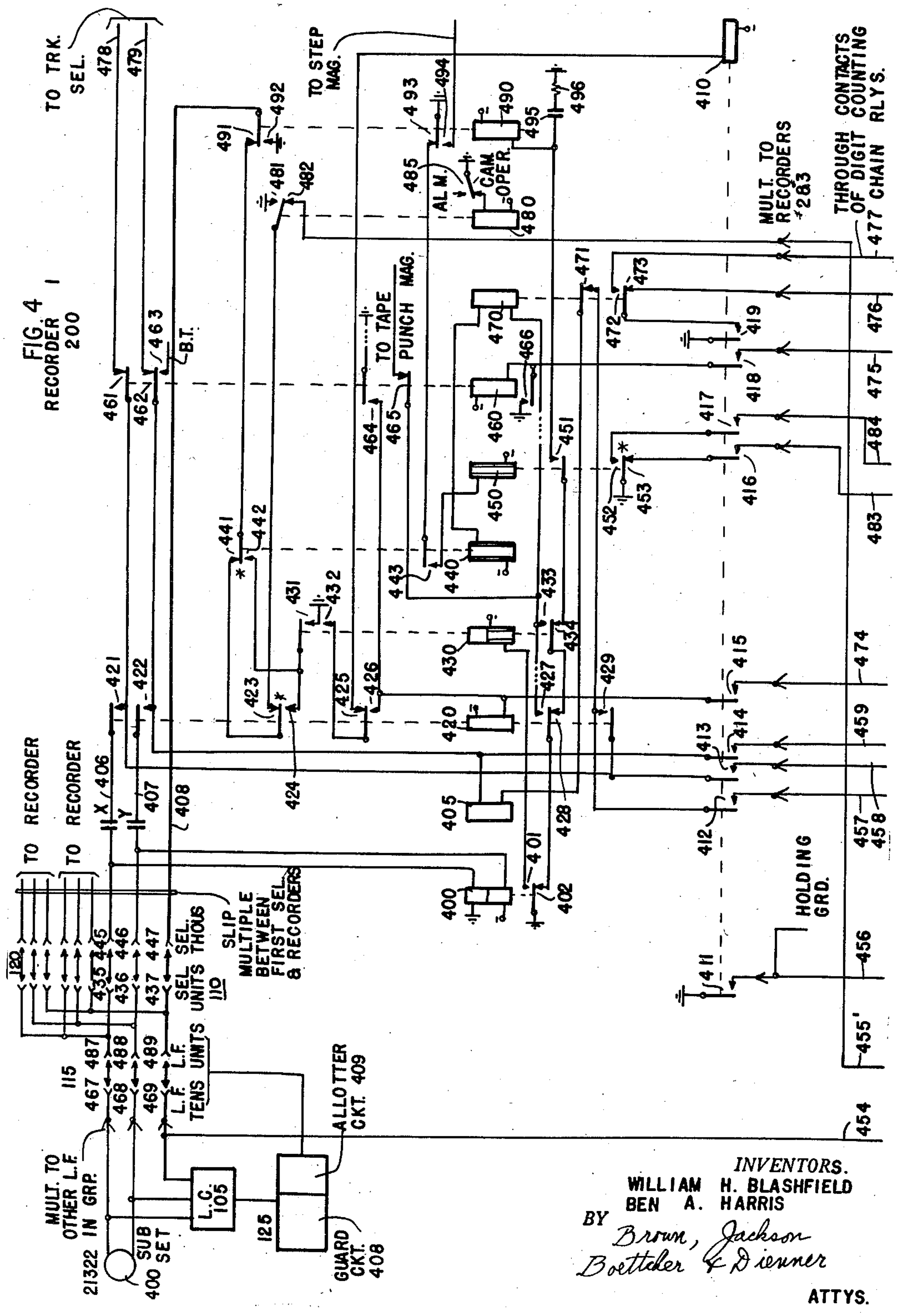
Figure 9:
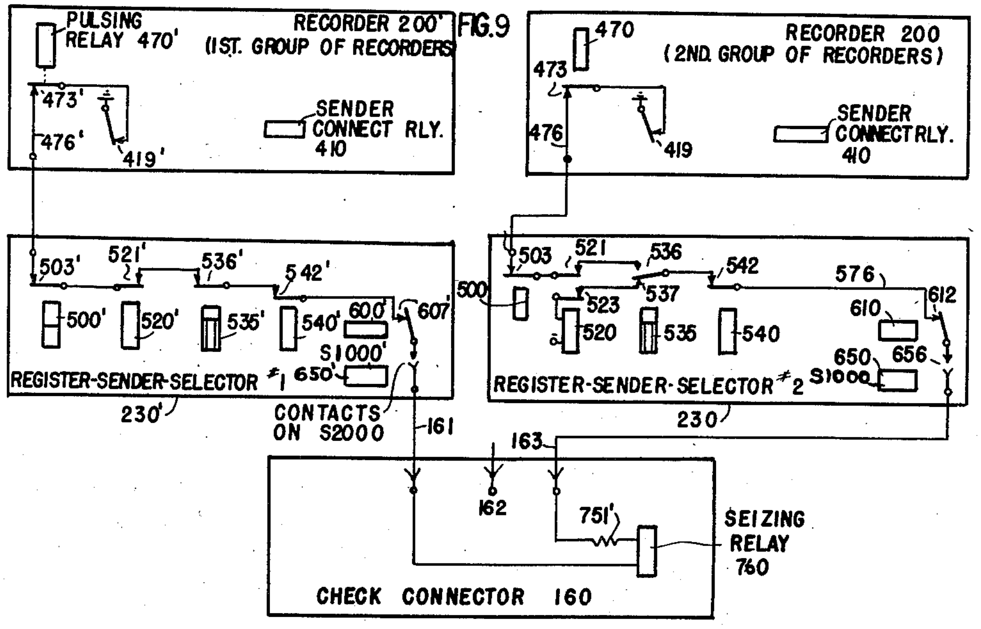
Figure 10:
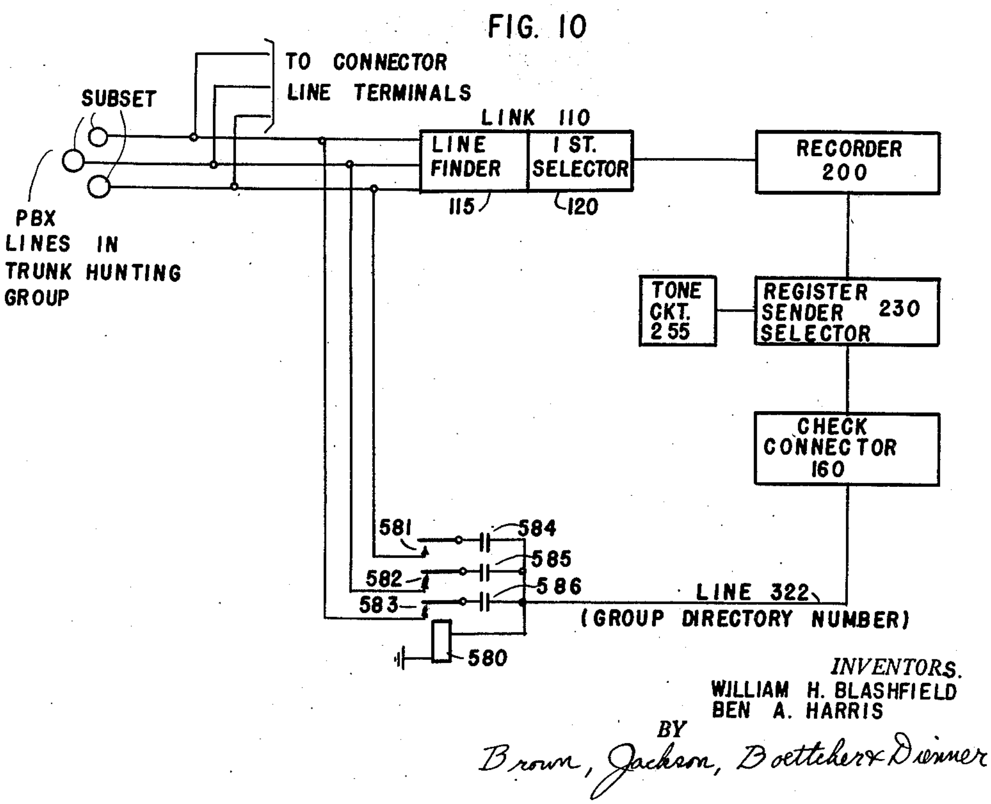

Other features and advantages of the novel connector switch and further features of the invention will become apparent from the following drawings, claims and specification, in which:

Figures 1–3 when aligned in proper relation set forth in block schematic form the automatic switching equipment of a telephone system including the novel calling number verification arrangement of the invention;

Figures 4–7 set forth in semischematic form the switches for use in providing the novel verification system for a toll ticketing system of the type generally set forth in the aforementioned copending application having Serial No. 368,066;

Figure 8 illustrates the manner in which a busy recorder makes the other recorders in its group busy;

Figure 9 sets forth the manner in which recorders of the various groups may have access to a common check connector via register-sender-selectors, and the manner in which the check connector is made busy to other register-sender-selectors; and Figure 10 sets forth a schematic block representive of the manner in which the equipment is operative with P. B. X lines.

There is set forth hereat a table of contents as an aid to the location of the descriptions of the various switches and switching stages taught in the following disclosure.

TABLE OF CONTENTS

1. General Description
2. Block Diagram
   A. Local Call
   B. Toll Ticketing Call
3. Establishment of a Test Connection
4. Brief Circuit Description
5. More Detailed Circuit Description
   A. Seizure
   B. First Trunk Digit
   C. Second Trunk Digit
   D. First Digit of Calling Number
   E. Second Digit of Calling Number
   F. Third Digit of Calling Number
   G. Fourth Digit of Calling Number
   H. Fifth Digit of Calling Number
6. Private Branch Exchange Lines

*1. General description*

In that the invention is basically directed to a novel verification circuit for use in a system wherein the calling party subscriber dials his own directory number for identification purposes, it is believed that the nature of such system is best presented by the use of block schematic illustrations such as shown in Figures 1, 2 and 3.

The automatic telephone system there shown is somewhat similar to the arrangements of the two copending applications, but has been simplified in certain respects for the purpose of more clearly presenting the novel verification circuit and the novel switches utilized therewith.

*2. Block diagram*

With reference to the block illustrations of Figures 1, 2 and 3, three exchanges A, B and C are interconnected in the manner of the aforementioned disclosures, and automatic toll ticketing equipment is provided at one exchange (A) for the purpose of providing records of calls which are extended between the three exchanges. Each exchange has a code number assigned thereto and in establishing a call to a subscriber in a distant exchange, the calling subscriber first dials the assigned code number for the exchange followed by the directory number of the calling subscribers followed by the directory number of the desired subscriber. As an example, exchange A has been assigned code 81, exchange B has been assigned code 82, and exchange C has been assigned code 83. Inasmuch as the details of such arrangement have been set forth in the previous applications, further description of the manner in which the equipment accomplishes call extension between the exchange is not believed to be necessary.

Each exchange serves a number of subscribers, each subscriber having in the illustrated example, five-digit directory number, i. e., subscribers P, Q, R, S and W have directory numbers 21322, 21222, 21122, 22122 and 32145 respectively. Each of the subscribers such as subscriber P has a line circuit, such as illustrated circuit 105 associated therewith, which is adapted to seize finder-selector link equipment, such as illustrated link 110, over common guard and allotter circuits, such as 125, for use in extension of a connection to local or toll subscribers. Subscriber A has a line circuit 305 which has access to links, such as illustrated link 310, and subscriber S has a line circuit 335 which has access to links, such as illustrated link 340. The connection of the other subscribers in the exchange is believed to be obvious therefrom.

As indicated in Figure 1, the various levels of the finder-selector equipment are assigned to provide different call extending operations. The first and second levels, as illustrated, are assigned for use in establishing local connections, the eighth level is assigned for use in establishing calls over the automatic toll ticketing equipment, and the tenth level is assigned for use in extending calls to the toll operator. The remaining levels may, of course, be assigned for use in accordance with the volume of the traffic in and between the various exchanges. In one operative exchange connected on a terminal per station basis, 4200 terminals and 2000 lines were served.

Local calls are extended over the assigned levels of the link selectors, such as 120, in accordance with the thousands groups designation of the desired subscriber, the levels of these selectors in turn having access to second selector switches, such as illustrated switches 130 and 135. Connector switches, such as illustrated connector 140, are accessible over the levels of the second selector switches. Each of these connectors, in turn, has access in a conventional manner to one hundred subscriber lines.

Toll calls to subscribers in the distant exchanges are extended over the eighth level of a selector, such as 120, in the seized one of the links, which level has access over a slip multiple to a number of recorder units, such as illustrated recorder 200. In one operative installation twelve recorders were accessed from all the local first selectors in exchange A via the slipped multiple.

Each recorder 200 has an associated trunk selector, such as 260, over which it extends the call to desired subscribers in associated exchanges such, as B and C. Each recorder is operative simultaneous with the extension thereby of the call over its associate selector to a subscriber of a remote exchange to effect registration of information concerning the call on an associated tape member via a punch and step mechanism, such as illustrated member 220, and to extend a test connection back to the calling line over the test connection switches including register-sender-selector 230 by check connectors 160, etc. Briefly, each recorder has tape punch equipment, such as the illustrated punch equipment 220, associated therewith to effect recording of the call information. A calendar 210 and a clock 215 common to all the recorders of the exchange operate the punch mechanism 220 via the recorders to record the time and duration of the call.

The register-sender-selectors, such as 230, are operative to route the connection over the various exchanges to the desired exchange in accordance with the nature of the trunk digit dialled by the calling subscriber and are also operative to route the calling party identification number as dialled to the local test switching equipment to effect extension of a test connection back to the calling line.

The exchange as illustrated includes a number of such register-sender-selector units, each of which is accessible to a given number of preassigned recorders. In one operative arrangement, it is found that one register-sender-selector, such as 230, would provide satisfactory service when assigned to serve three recorder units.

The register-sender-selector equipment 230 may be similar to that set forth in the copending application having Serial No. 368,066, and includes as basic members thereof a counting chain 600, a register relay set 587 and a register sender 250, which route the call to the desired one of the exchanges, a counting chain 235 for controlling the operating sequence of the various units, and a check selector 240 which is responsive to two digits dialled to select first a thousands group of lines and then a hundreds group.

As illustrated, the thousands digit levels of a check selector, such as 240, access a number of pairs of check connectors, such as illustrated connector pairs 160, 164; 165, 166; 170, 171; 175, 176. The first three hundred digit levels have access to check connector 160 which in turn has access to the first three hundred lines of the selected thousand group; and a second connector 164 which is connected in such manner that test connections may be established at any given time to more than one subscriber line of the associated three hundred group.

Check selector 240 is operative in establishing the check connection to the check connector 160 to extend a circuit over one of three conductors which are connected thereto, the particular one of the conductors extended thereto being determined by the hundred group designation of the calling subscriber. Check connector 160 is then operated to select the three calling lines of the three hundred lines associated therewith, which have the same tens and units designations as the calling number, the desired one of the three lines being extended in accordance with the particular conductor over which the connector was seized, such extension involving a single wire connection to the P-wire of that line.

In a similar manner, connectors 165 and 166 serve lines 400–600 of the selector thousands group; connectors 170 and 171 serve lines 700–900 of that group; and connectors 175, 176 serve subscribers of the 000 group.

As the last digit of the calling party number is received, the seized register-sender-selector, such as the illustrated unit 230 connects the tone check circuit 255, which is common to all of the recorder-sender-selectors to the test connection. If the party has accurately dialled his directory number, a loop will have been extended through the switching equipment. If the test circuit 255 detects such loop, the equipment is prepared to further extend the call in accordance with the digits next dialled by the subscriber. If the tone test circuit does not locate such loop, the call extending operation is terminated, and busy tone is returned to the subscriber.

A. LOCAL CALL

The manner in which the exchange switching equipment is operative to establish a connection between local subscribers will now be briefly set forth. With reference to the illustrated ones of the subscribers in exchange A, the associated director numbers are assigned on a terminal per station basis, the digit designations being as follows:

First digit—prefix digit
Second digit—thousands digit
Third digit—hundreds digit
Fourth digit—tens digit
Fifth digit—units digit Assuming that a subscriber in a third hundred group of the first thousands group, such as the illustrated subscriber P having directory number 21322, desires to extend a connection to subscriber A having directory number 21222, subscriber P lifts his receiver from the substation set in the conventional manner to effect seizure of his associated line circuit, such as illustrated line circuit 105, which via a guard and allotter circuit, such as illustrated circuit 125, seizes an idle line-finger-selector link, such as illustrated link 110. The guard circuit then operates in a conventional manner to extend the calling line through the selected finder 115 to the first selector 120 of the seized link 110.

The illustrated first selector is connected to absorb the prefix digit, and accordingly as the calling subscriber now dials the prefix digit 2 of the desired party, the selector operates to absorb same in a well known manner. As the thousands digit 1 is next dialled, the calling line is extended over the first selector level to an idle second selector, such as the illustrated selector 130. The hundreds digit "2" is then dialled, and the selector switch 130 is operative to seize an idle one of the connectors associated with the second hundreds group, such as illustrated connector 145. As the tens digit 2 and units digit 2 are then dialled, the connector operates to select the second tens group of lines, and thereafter the second line of the second tens group to thereby complete the connection to the desired subscriber Q having the directory number 21222. The connector thereupon rings the called line with the frequency determined by the directory number, and as the calling subscriber lifts his receiver in response thereto, a conversation loop is automatically completed in the conventional manner.

It is apparent from the foregoing that if the illustrated subscriber P desires to call the subscriber R having directory number 21122, the call is routed over the first level of the seized first selector, such as illustrated selector 120 and over the first level of the seized second selector, such as illustrated selector 130 and over a seized connector such as illustrated connector 150, to the subscriber line having directory number 21122. In a like manner, if subscriber P desires to call local subscriber S having directory number 22322, the connection will be routed over the second level of a seized first selector, such as 120; the third level of a seized second selector, such as 135, and a seized connector such as illustrated connector 155 to the desired subscriber S.

The operation of the equipment by illustrated subscribers such as Q, R and S in extending calls to each other and to subscriber P is believed to be obvious from the foregoing, and accordingly no further description thereof is believed to be required.

It is apparent from the foregoing description that calls are established between local subscribers responsive to removal of the receiver from the substation by a calling subscriber and the dialling thereafter of the directory number of the subscriber desired.

B. TOLL TICKETING CALL

As pointed out heretofore, an object of the present invention is to provide an automatic telephone system which provides local and toll ticketing calls utilizing a reduced amount of equipment, and particularly to provide a novel system of the type wherein the calling party dials his own number to the recording equipment for identification purposes. Basic to the provision of this novel system is the provision of novel equipment for extending a single conductor check connection back to the calling party simultaneously with the registration of the calling party number upon the recording equipment. Tone check equipment operates as the number has been dialled to test the connection established, and specifically whether or not the connection was established to the calling party line. In the event that the calling subscriber has recorded a number other than his own with the initiation of a toll telephone call, the equipment terminates further extension of the connection. Unscrupulous parties are thus prevented from charging tool calls to subscribers on other lines.

The following brief description traces the switches utilized in the establishment of a toll call as well as the check connection, and particularly the stages of switching which are effected responsive to the dialling of each of the digits.

The following description sets forth briefly the manner in which a connection is established by subscriber P, located in exchange A and having directory number 21322, to subscriber W who is located in exchange C and has directory number 32145. As indicated previously herein, the switching equipment in the several exchanges is generally similar to that set forth in copending application having Serial No. 368,066, and accordingly only a broad description of the operations accomplished thereby will be set forth hereat.

As the calling subscriber P removes his receiver from the substation thereat, an associated line circuit 105 through the instrumentality of the guard and allotter circuit, such as illustrated circuit 125, causes an idle line-finder-selector link, such as illustrated link 110, to be seized. The guard circuit 125 then operates to extend the calling line through the line finder 115 to the first selector 120 of the seized link 110.

The calling subscriber now dials the code number assigned to exchange C (83 in the present example) followed by his own directory number, and thereafter the directory number of the desired subscriber W. As a result of the dialling of the digits of these code and directory numbers in succession, the tape punch mechanism associated with recorder 200 at exchange A will record as perforations on the tape the following information:

| Trunk Code Number | Calling Number | Called Number |
|---|---|---|
| 83 | 21322 | 32145 |

As taught in the copending application, the switching equipment is operative responsive to receipt of the above numbers to extend the connection over the tandem exchange B (82) to the tandem exchange C (83), to record the message as above described; to extend a test connection back to the calling party line, and if the connection indicates that the calling party has dialled his own number, to extend the connection to the desired subscriber W in exchange C having directory number 32145.

Specifically, as the calling subscriber dials the first trunk digit "8," the seized first selector, such as illustrated selector 120, advances to the eighth "level" to seize an idle one of the recorder units, such as illustrated recorder unit 200 which is associated therewith. The seized recorder 200, in turn, seizes its associated register-sender-selector circuit such as illustrated circuit 230, and its associated trunk selector, such as illustrated selector 260 which is tied back to back with the recorder 200.

As the second trunk digit "3" of the trunk code "83" is transmitted, the recorder repeats same to the seized register-sender-selector 230 and to the trunk selector 260. With the receipt of the digit "3" by trunk selector 260, the trunk selector advances to the third "level" to extend a connection to a selector, such as 270 in tandem exchange B. Simultaneously digit "3" is registered on the register-sender-selector 230, which responsively prepares its sender equipment for the transmission of an additional digit (in the present example, digit 9) to the seized selector 270 in exchange B.

As the calling partly initiates the transmission of his directory number to the recorder, the digits are transmitted into the register-sender-selector, but not to the trunk selector 260. Simultaneously with the initiation of the transmission of his directory number by the calling party, the register sender transmits the digit which accomplishes advancement of the selector 270 in exchange B to the level which extends the connection to the distant exchange C (this digit being digit nine in the present example). Thus, by the time the calling party number is dialled and registered, the equipment will have automatically extended a connection to the desired one of the exchanges.

The operation of the equipment in establishing a test connection responsive to receipt of the calling party number 21322 is now set forth. It is noted that the register-sender-selector 230 is connected to absorb the prefix digit of the five digit calling number, and accordingly the first digit "2" is received without effect. As the seized or thousands digit "1" of the calling party number is next dialled, the check selector 240 advances to the thousands digit first "level" thereof to select the first one thousand line group of calling subscribers at exchange A.

As is apparent from the block diagram, the check selector 240 is now operated to select one of the check connectors having access to the three hundred lines which includes the calling party line. That is, with reference to the hundreds digit "levels" thereof, it is apparent that if hundreds digit 1–3 is dialled, a connector, such as illustrated connector 160 or 164 is seized; if digits 4–6 are dialled, a connector such as the illustrated connector 165 or 166 is seized; if digits 7–9 are dialled, a connector such as the illustrated check connector 170 or 171 is seized; and if digit ten is dialled, a check connector such as illustrated connector 175 is seized.

Inasmuch as the hundreds digit in the directory number of calling subscriber P is "3," the check selector advances to the third level and seizes a check connector, such as illustrated connector 160. Each test connector has three incoming paths, such as the incoming paths 161, 162, 163, for test connector 160. As shown hereinafter, the path over which the connector is seized marks the hundreds group of the calling line desired. Since the calling line in the present example is in the third hundreds group, the check connector 160 is seized over conductor 163. If the calling line had been in the second hundreds group, the check connector 160 would have been seized by the selector 240 over the second incoming conductor 162, and if the calling line had been in the first hundreds group, the check connector 160 would have been seized by selector 240 over the first incoming conductor 161.

As shown in detail hereinafter, each units relay in each check connector has contacts extending to the same numbered P-wire in each of the three different hundreds groups, and accordingly effects selection of the three P-wires having the same tens and units designators as it is operated in response to receipt of the tens and units digit of the calling party number. The selection of the calling subscriber line from the three lines selected by the connector units relays is accomplished in accordance with the particular one of the incoming lines 161–163 over which the check connector 160 has been seized. That is, if the connector has been seized by the check connector over conductor 161, the outgoing connection is extended over conductor 164 to the P-wire of the subscriber R having directory number 21122; if the check connector 160 had been seized over the second conductor 162 extending to the second level of check selector 240, the outgoing circuit of the check connector 160 will be completed over conductor 165 to the P-wire of the subscriber Q having directory number 21222. In the present example, the check connector 160 has been seized over the incoming conductor 163, and the third level of check selector 240, and accordingly the circuit will be extended to the P-wire circuit of the subscriber P having the directory number 21322.

Following receipt of the last digit of the calling party number, the register-sender-selector 230 engages the common check tone circuit 255, which now attempts to transmit a timed signal to test for the completion of a P-wire loop.

If the check tone test is negative (if the calling party has not accurately dialled his own directory number and the loop has not been completed), the check tone circuit 255 signals the recorder 200 (as described in the previous application) via the register-sender-selector 230, and the recorder 200 applies busy tone to the calling line, blocks the call from further extension and releases the register-sender-selector 230.

However, if the check tone test is positive (if the calling party has accurately dialled his own number to effect completion of the test connection back thereto), the check tone circuit 255 operates to permit further extension of the call by the subscriber and the recorder 200 releases the register-sender-selector 230.

Assuming the check tone test was positive, as the calling subscriber now dials the directory number of the called party (32145 in the present example), the digits are extended from the dial contacts of the subset of subscriber P over line finder circuit 115, the eighth level of the local first selector 120, the recorder circuit 200, the third level of the trunk selector 260, the ninth level of the tandem exchange selector 270 in exchange B into seized switches in the distant exchange C, such as the illustrated selector 275, and connector 290, to cause same to seize the called line. As the called subscriber W removes his receiver from his substation set, the desired connection is completed.

With answer by the called subscriber, the recorder 200 seizes calendar equipment 210 and clock equipment 215, which is common to all of the recorders, and the calendar responsively transmits the date and the time of the day via the recorder 200 to the tape punch mechanism 220 thereat. After the registration of this information upon the tape, the calendar is dismissed.

For the duration of the call the clock 215 delivers quarter minute impulses to the recorder 200, which in turn transmits minute impulses to the tape punch mechanism 200 for recording purposes, whereby an indication of the elapsed time of the call is provided.

As the called party restores the receiver to his handset, the minute impulses to the tape punch mechanisms are stopped. As the calling party hangs up, the equipment utilized in the establishment of the call is restored.

*3. Establishment of a test connection*

There will now be set forth hereat in detail the manner in which the circuit equipment is operative to establish the test connection over the various exchange switches to the calling line, and the specific manner in which four operating functions, that is, busy test, seizure, dialling, and calling loop tone tests are accomplished over a single "P" wire test circuit.

It will be recalled from the previous description that during the period that the calling party dials his own directory number, the number dialled is recorded on the tape, and a test connection is completed to the line represented by the calling number. Thus, if the calling party has accurately dialled his own directory number, a test connection will be extended back to his own line and the test will verify the accuracy of the number dialled. The following chart illustrates in brief summary form the switching operations accomplished in the establishment of a test connection to a calling line:

| | |
|---|---|
| Subscriber removes hand set | Line circuit 105 effects seizure of an idle link 110 which extends the subscriber line over associated line finder 115 to local first selector 120. |
| Subscriber dials Exchange Digit 83 | Local first selector advances to eighth "level", effects seizure of idle recorder 200 and associated register-sender-selector 230 and trunk selector 260. Trunk selector 260 advances to third "level" extending connection to exchange C. Recorder prepares to extend test connection to calling line. |
| Subscriber dials first digit (2) | Register-sender-selector 230 absorbs digit 2. |
| Subscriber dials second digit (1) | Check selector 240 advances to "first" level to select first thousand group of subscribers. |
| Subscriber dials third digit (3) | Check selector 240 advances to third "level" to seize an idle one of the check connectors such as 160 over conductor 163. |
| Subscriber dials fourth digit (2) | Check selector 160 advances to second "level" to select the second tens group of the three different hundreds groups associated therewith. |
| Subscriber dials fifth digit (2) | Check connector 160 advances to second "level" to select the second units conductor of the second tens group of each of the three different hundred groups of lines associated therewith. The one line of the three is thus selected in accordance with the particular incoming path over which the check connector 160 has been seized. |
| Following dialling of the calling party number by the calling subscriber. | Recorder 200 causes common check tone circuit 255 to verify the number dialled. |

*4. Brief circuit description*

The recorder 200 shown herein is somewhat similar to that set forth in the copending application, Serial No. 368,066, it having been modified to include basically those elements which are essential to a disclosure of the manner in which the sender operates to effect extension of a check connection back to the calling line. Further, those portions of the sender, such as the register sender, counting chains, etc., which were disclosed in detail in the copending application have been shown schematically herein, appropriate reference being made to the copending application as necessary.

The following chart provides a simplified picture of the relation between a number of the relays which are shown in the two disclosures:

| Relay | Present Disclosure | Disclosure of Application S. N. 368,066 |
|---|---|---|
| Pulse Relay | 470 | 620 |
| Loop Coil | 405 | 568 |
| Non-Check | 460 | 630 |
| Line Relay | 400 | 520 |
| Sender-Release and Call Extension | 420 | 590 |
| Hold Relay | 430 | 525, 530 |
| Digit Following Relay | 440 | 555 |
| Auxiliary Relay | 450 | 560 |

It is noted that an additional relay 480 identified as the "low tape" indication relay has been added to the present arrangement. Also, a spacing relay 490 has been included herewith for rebusying the P-wire and running intercall spaces in a manner slightly different from that shown in the former application.

The relation between the conductors shown in the copending application and the present disclosure is now set forth:

*Recorder to sender conductors*

| Present Disclosure | Previous Disclosure | Identification |
|---|---|---|
| 457, 458, 459 | 971, 974, 972 | Permits sender to control dialling into second selector. Three conductors are used because sender itself may dial into second selector or it may prevent subscriber from dialling a second selector. |
| 474 | 828 | Operating circuit for sender-release and call extension relay. |
| 483, 484 | 818, 885 | Drive digit counting chain in sender. |
| 475 | 837 | Non-check lead. |

Conductor 476 extends between the recorder 200 and the register-sender-selector 230 to permit pulsing of the check connectors, such as 160, by the recorder 200.

The digit counting chain 235 is analogous in general to the digit counting chain comprising relays 810—860 in the copending application, and accordingly as shown in schematic form herein. The sender 250 is analogous to the sender 231 of the copending application, and register relays 600—645 are analogous to register relays 1000—1090 of the copending application. Contacts sets 2 and 6 on each if the chain relays have been wired to provide check connector control paths. Relay 560 is analogous to relay 960, and relays 563 and 565 are analogous to pulsing relays 950 and 955 in the previous application. Start relay 550 blocks or advances a call in accordance with the results of the tone test. Tone test conductors 567, 568 and 569 are analogous to tone test leads 701*c*, 702*c*, 703*c*. Check connector selection relays 520, 527, 535 and 540 have also been added to the present arrangement.

Figure 7:
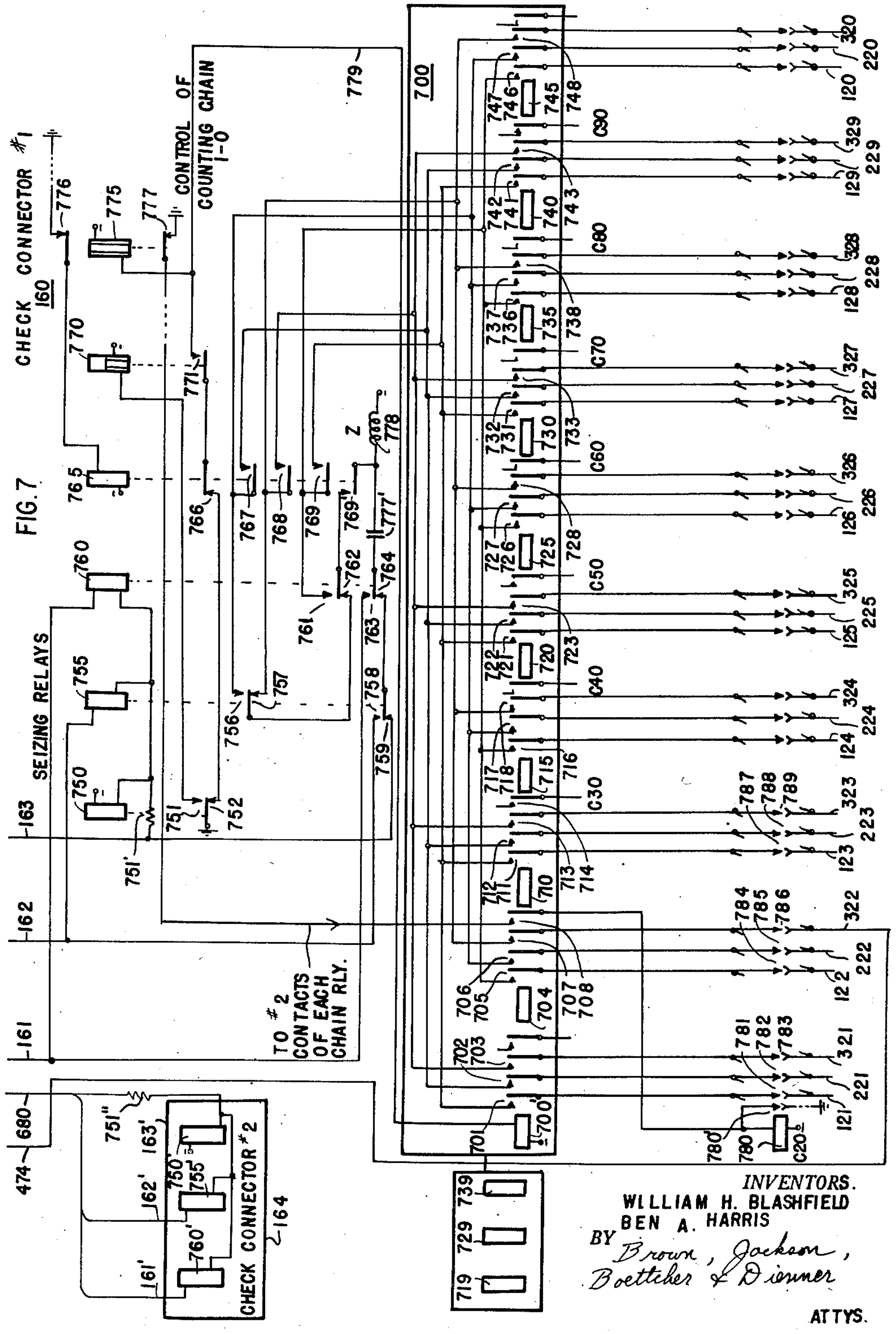

A novel check connector, such as illustrated in block at 160, 164, 165, etc. is shown in detail in Figure 7. Seizing relays 750, 755, 760 in the connector are operated singly and in various combinations in accordance with the selector level over which the connector is seized. The connector includes a conventional counting chain and advancing arrangement including relays 700—745, 719, 729, 739, which are similar to the chain arrangement shown in the register-sender-selector. Both of these chains are conventional, and accordingly are shown herein in schematic form. For a more detailed description of operation of such a chain, reference may be made to copending application, Serial No. 220,261. Counting chain relays 700—745 are connected to control operation of an associate set of register relays 780—815. Register relays 780—815 are controlled, with relays 700—745, to select the P-wires of the three lines in the three different hundreds groups of lines assigned thereto which have the same units and tens designation numbers. The connector seizing relays 750, 755, 760 thereafter cooperate therewith to select the desired one of the three lines thus selected. The functions of connector relays 765, 770 and 775 are set forth in detail hereinafter.

5. *More detailed circuit description*

A. SEIZURE

The specific switching operations which are effected to establish the aforegoing test connection are now described in detail. With reference to Figures 4–7, as the calling subscriber P removes his handset from his substation 406, associated line circuit 105 is seized, and the line circuit 105 responsively seizes an idle link, such as illustrated link 110, which has been preselected by the allotter circuit 409 in the conventional manner. The guard circuit 408 operates to extend the calling line through tens and units relays of the line finder switch 115 of the seized one of the links 110 to the first selector 120 associated therewith. With extension of the connection thereto, dial tone is returned to the substation of the calling subscriber P to indicate to him that he may proceed with the dialling operation.

In the present example, we are assuming that subscriber P having directory number 21322 in exchange A is extending a connection to subscriber W having directory number 32145 in exchange C. Accordingly, the calling subscriber P dials the code trunk number 83 followed by his own directory number 21322, and in turn the directory number of the called party 32145.

B. FIRST TRUNK DIGIT

As the calling subscriber dials the first digit (8) of the trunk code (83), the first selector 120 of the seized link 110 is operated to the eighth "level," and responsively effects selection of an idle recorder, such as illustrated recorder 200, which are accessed off a slip multiple on the eighth level of the selector 120. Assuming the illustrated recorder 200 is idle, selector units contacts 435, 436, 437 and selector thousands contacts 445, 446, 447 are closed to connect a signalling circuit from the calling subscriber substation to the seized recorder 200. The manner of seizure of an idle recorder of a group is the same as seizure of an idle link, and is well known in the art. Since each register-sender-selector 230 has three recorders, such as 200, associated therewith, the seizure of the register-selector-sender 230 by one of the recorders must necessarily mark the remaining two recorders of the group busy to the first selectors, such as 120.

It is assumed for purposes of simplicity hereat that the recorder unit 200 and the other two recorders common to register-sender-selector 230 are in the idle condition as the selector tests same for seizing purposes. The manner of marking the remaining recorders busy as one of the recorders of a group is seized will be described more fully hereinafter.

As the illustrated recorder 200 of the group accessible to the eighth "level" of the selector 120 is located, an operating circuit is extended from the subscriber set to the recorder line relay 400, the circuit extending from the loop at the subscriber set over the closed tens contacts 467, 468, and the closed units contacts 487, 488 of the line finder 115, the units contacts 435, 436 and the thousands contacts 445, 446 of the first selector 120 through the windings of the recorder line relay 400 to positive and negative battery.

Recorder line relay 400 operates, and at its contacts 401 completes an obvious circuit to associate slave relay 430 which is of the slow-to-release type.

Associate relay 430 operates, and at its contacts 433 prepares an operating circuit for the pulse relay 470 and the digit following relay 440; and at its contacts 432 connects operating ground to the sender connect relay 410, the circuit extending from negative battery over the winding of relay 410, contacts 425 and 432 to ground.

Sender connect relay 410 operates, and connects the conductors 457, 458, 459, 475, 476, 477, 483 and 484 between the recorder circuit 200 and the register-sender selector circuit 230.

Sender connect relay 410 at its contacts 411 connects ground to P-wire 408, 408′, 408″, as shown in Figure 8 and described below, making busy the first selector multiple for the three recorders of the group associated with register-sender-selector 230, whereby seizure thereof by other selectors seeking an idle recorder is prevented. The busy circuit extends from ground over contacts 411, contacts 501, contacts 482, 423, 441, 491 and the P-wire 408 to the selector circuit.

The manner in which the application of ground to the P-wire of one recorder effects application of ground to the P-wires of the other recorders to make these recorders busy to the first selector is more clearly shown in the schematic sketch of Figure 8. With brief reference thereto, it is apparent that as any one or the recorders of a group associated with a single register-sender-selector (such as recorders 200, 201, 202, associated with the illustrated unit 230) is seized, the connection by the seized recorder of positive battery over conductor 456, contacts 501 and conductor 455 to its associated P-wire, such as illustrated P-wire 408 will also cause the P-wire 408′, 408″ of the remaining recorders in the group to be marked with ground. Accordingly, if the register-sender-selector 230 is being utilized by one of the recorders 200, 201, 202, the remaining recorders will be marked as busy.

With reference once more to Figure 4, as sender connect relay 410 operates, it is also effective at its contacts 412 and 413 to close the loop circuit to the trunk selector 260 which is tied to the recorder 200 to effect the seizure thereof, the seizing circuit specifically extending from positive battery over the upper winding of the trunk selector line relay (not shown) over positive conductor 478 to recorder 200, contacts 461, 413, conductor 458, contacts 561, conductor 457, contacts 412, 471, the winding of coil 405, contacts 462 and negative conductor 479 to the lower winding of the line relay (not shown) in selector 260 and negative battery. Sender connector relay 410 at the contacts 416, 417 and 477 prepares operating circuits for the register-sender-selector switch 230 assigned thereto.

The system is now in condition to receive the second digit of the trunk code number 83.

C. SECOND TRUNK DIGIT

As the calling subscriber now dials the second digit "3" of the trunk code 83, the line relay 400 in the seized recorder 200 follows the incoming impulses and controls the register-sender-selector 230 and associated trunk selector 260 to operate in accordance therewith.

Briefly, as recorder line relay 400 restores responsive to receipt of the break period of the first impulse, recorder line relay 400 is effective at its contacts 402 to complete an operating circuit for the recorder pulsing relay 470, in series with the digit following relay 440, the circuit specifically extending from negative battery over the winding of relay 440, relay 470, contacts 427 and 402 to ground.

Digit following relay 440 being slow-to-release remains operated for the duration of the receipt of each digit representing group of impulses, whereas pulsing relay 470 follows each of the impulses of the group as received.

Recorder pulsing relay 470 in following the incoming pulses is effective at its contacts 471 to effect opening and closing of the loop extending to the line relay of the associated trunk selector 260 to cause same to advance to the level indicated by the number of impulses received; and at its contacts 472 repeats the impulses over conductor 477 to the counting chain 600 in the register-sender-selector 230 to register the second trunk digit thereupon.

Digit following relay 440 operates, and at its contacts 443 completes an energizing circuit to associate relay 450, which at its contacts 452 completes an operating circuit over contacts 417 and conductor 484 to the first relay in the digit counting chain 235 for the register-sender-selector 230. The manner of control of the digit counting chain 235 by the digit following relay 450 will be apparent from reference to the copending application 368,066, and the manner in which relays 560 and 570 are effective over conductors 615 and 885 to control advancement of the digit counting chain 810—860, and with reference to the following chart:

CHART I

| | Digit | Recorder | Digit Counting Chain | Functions |
|---|---|---|---|---|
| Trunk Digit | 8 | ----- | ----- | |
| | 3 | 450 | 518 | |
| | | (450) | 517 | R3. |
| Calling Party Number | 2 | 450 | (518) | Sending relays 563 and 565 pulse until 555 operates. |
| | | (450) | 515 | |
| | 1 | 450 | (517) | |
| | | (450) | 513 | 650, 540, 535. |
| | 3 | 450 | (515) | |
| | | (450) | 510 | 540 Busy Test 535 Period. |
| | 2 | 450 | (513) | |
| | | (450) | 506 | |
| | 2 | 450 | (510) | |
| | | (450) | 500 | Check tone test. |

The manner of operation of the pulsing relay 470 at its contacts 472 to register the incoming trunk digit upon the register-sender-selector chain 600 over control conductor 477 will be apparent with reference to the manner in which the pulsing relay of a selector switch pulses its associated counting chain. The following sequence chart sets forth the relays operated as each impulse of a set is received.

Briefly, as the recorder line relay restores with receipt of the first break period, pulsing relay 470 operates, and at its contacts 472 effects the operation of the first counting chain relay 600′. As the line relay 400 reoperates at the end of the first pulse, recorder dialling relay 470 is restored, and at its contacts 472 interrupts the shunting circuit for the first sequence relay 649′ to cause same to operate in series with the first counting chain relay 600′. The chain advances in a conventional manner as each succeeding impulse is received.

CHART II

| | Recorder | Counting Chain |
|---|---|---|
| 1st pulse | 470 | 600′ |
| | (470) | 649′ |
| 2nd pulse | 470 | 605 |
| | (470) | 649, (600′), (649′) |
| 3rd pulse | 470 | 610 |
| | (470) | 648, (605), (649) |
| 4th pulse | 470 | 615 |
| | (470) | 649′, (610), (648) |
| 5th pulse | 470 | 620 |
| | (470) | 649, (615), (649′) |
| 6th pulse | 470 | 625 |
| | (470) | 648, (620), (649) |
| 7th pulse | 470 | 670 |
| | (470) | 649′, (625), (643) |
| 8th pulse | 470 | 635 |
| | (470) | 649, (670), (649′) |
| 9th pulse | 470 | 640 |
| | (470) | 648, (635), (649) |
| 10th pulse | 470 | 645 |
| | (470) | 649′, (640), (648) |

Inasmuch as the second trunk digit, in the present example is digit "3," it is apparent that as the third impulse is received from the dial of the calling subscriber, the counting chain will come to rest with chain relays 610 and chain sequence relay 648 in the operated condition.

As taught in detail in the copending application, the operated condition of the third counting chain relay as the last impulse of the second trunk code digit is received indicates that exchange C is desired.

A brief period after the last impulse of the second trunk code digit "3" has been received, the digit following relays 440 and 450 restore, and at its contacts 453, relay 450 effects advancement of the digit counting chain 235 one step in the manner described in the copending application. Specifically, at this time, the digit following relay 450 at its contacts 453 effects the series operation of the first and second counting chain relays 517 and 518, which operate to in turn effect registration of the code number on the operated register relay of set 587. In the present example, the third relay 570 of that set is operated, the circuit extending over contacts on chain relay 517, 518, and the operated ones of the relays 648, 649, 649′ and 600′—645, i. e., relays 610 and 648. Relay 570 locks, independent of its operating circuit. The digit counting chain relays 517 and 518 are also effective to complete an operating circuit for transfer relay 560 which operates and at its make-before-break contacts 561—562 transfers the pulsing circuit for the selector 260 from control thereof by the recorder 200 to the control of the sender pulsing relay 563, the loop therefore now extending from positive battery over the upper winding of the line relay (not shown) in the trunk selector 260, positive conductor 478, contacts 461, contacts 413, 562, 564, conductor 459, contacts 414, 462, negative conductor 479 to the lower winding of the line relay for the trunk selector 260 and negative battery thereat.

The transfer relay 560 is analogous to relay 960 of the copending application, and the operating circuit is accordingly shown briefly hereat.

D. FIRST DIGIT OF CALLING PARTY NUMBER

The subscriber now initiates transmission of his assigned directory number to the equipment for the purpose of providing a record of the call initiated by him over the toll equipment. As in the copending application, the equipment is operative in response to receipt of the calling party number to effect registration thereof upon the associated tape member to establish a test connection back to the calling line, and to initiate extension of a connection over such tandem exchanges as are necessary to reach the desired one of the exchanges in the system.

Briefly, as the subscriber now dials the first digit "2"

of his assigned directory number, the digit following relay 440 and pulsing relay 470 operates in series, in turn operating relay 450, the digit following relay 450 effecting restoration of the first relay 518 in counting chain 235.

The first counting chain relay 518 in its restoration is effective at its contacts 519 to complete a circuit to the sender 250, whereby the sender actuates sending relay 563 therein to transmit pulses over the trunk selector 260 to the switches in the tandem exchanges, the nature of the pulses being such that the sender 250 effects the automatic establishment of a connection to the particular one of the exchanges (C in the present example), as indicated by the trunk code number (83) which was dialled by the calling subscriber. That is, since the ninth level of the tandem exchange selectors, such as 270 in exchange B, have access to the call extending equipment in exchange C, the sender must necessarily transmit the digit "9" over the connection to the tandem exchange selector 270 to effect extension of the connection to exchange C. As described in the aforementioned copending application, the nature of the digit or digits to be transmitted by the sender is determined by the particular register relay which is operated at the time the calling party initiates transmission of his assigned directory number to the equipment. In the present example, the third register relay 570 is operated as a result of the calling subscriber having dialled the trunk code number 83, and the third register relay 570 at its contacts controls the transmitting relay 563 (in the manner shown in the aforementioned copending application) to transmit nine impulses over the aforedescribed loop to the tandem exchange selector 270 in exchange B.

As the transmitting relay 563 in the sender 250 effects the transmission of the nine impulses, an operating circuit is completed for the register stop relay 555, the circuit extending from negative battery over the winding of relay 555, contacts 572 of the operated one of the registered relays (in the present example, the third register relay 570) to ground in the sender.

As the register stop relay 555 operates, it terminates pulse transmission by opening its contacts 556 whereby the sender causes the transmitting relay 563 to cease sending, and effects restoration of the equipment in the sender. Stop relay 555 is also subsequently restored. The details of the operating circuit for the sender equipment, and its cooperation with the register relay set is set forth in the copending application.

It is noted that the sender equipment is operative to effect extension of a connection to the desired one of the exchanges in response to receipt of the first digit of the calling party number, but that the first digit of the calling party number which is transmitted by the calling party is, in effect, absorbed by the equipment. That is, although the pulsing relay 470 in the recorder repeats the impulses representing the first digit of the calling party number (in the present example "2"), to the control conductor 477, which extends the pulsing circuit to the counting chain 600, certain contacts (not shown) on the second relay 517 of the digit counting chain 235 are open, and the circuit is interrupted so that the pulses are prevented from reaching the counting chain 600. The first digit of the calling party number is thus absorbed.

Transfer relay 560 is operated by the chain 235 and locks independent of chain 235. At its contacts 561, relay 560 maintains recorder pulsing circuit for trunk selector 260 in the open condition to prevent the impulses representing the calling party number from reaching same.

It is apparent from the foregoing description that the transmission of the first digit of the calling party number effects transmission by the sender of the digits necessary to the establishment of a connection with the switching equipment in the desired exchange. The first digit is absorbed by the register-sender-selector 230 and further preparation of the various equipment in the register-sender-selector is effected preparatory to extension of the test connection back to the calling line in response to receipt of the remaining four digits of the calling number.

E. SECOND DIGIT OF CALLING NUMBER

As the calling party dials the second digit of the calling party number (digit "1" in the present example), the counting chain 600 operates the selector relays 240 to select the thousands group of lines designated by the digit received.

As the recorder line relay 400 operates in response to the first incoming impulse (and only impulse in the present example), it effects the operation in series of pulsing relay 470 and the digit following relays 440 and 450, which in turn controls advancement of the digit counting chain 235 in the manner previously described, the operation effected at this time as shown in Chart I comprising restoration of the second counting chain relay 517.

Recorder pulsing relay 470 operates in response to the single pulse received to effect advancement of the counting chain 600 to the first relay 600′ and the operation of sequence relay 649′ associated with the chain, the nature of operation of the equipment responsive to receipt of a digit comprised of more than a single pulse being obvious from Chart II appearing hereinbefore.

After the elapse of a predetermined time following receipt of the single impulse, which time is determined by the slow-to-release characteristics of the digit following relays 440 and 450, relays 440 and 450 restore to effect operation of the fourth counting chain relay 513 in series with the third counting chain series 515.

Figure 6:
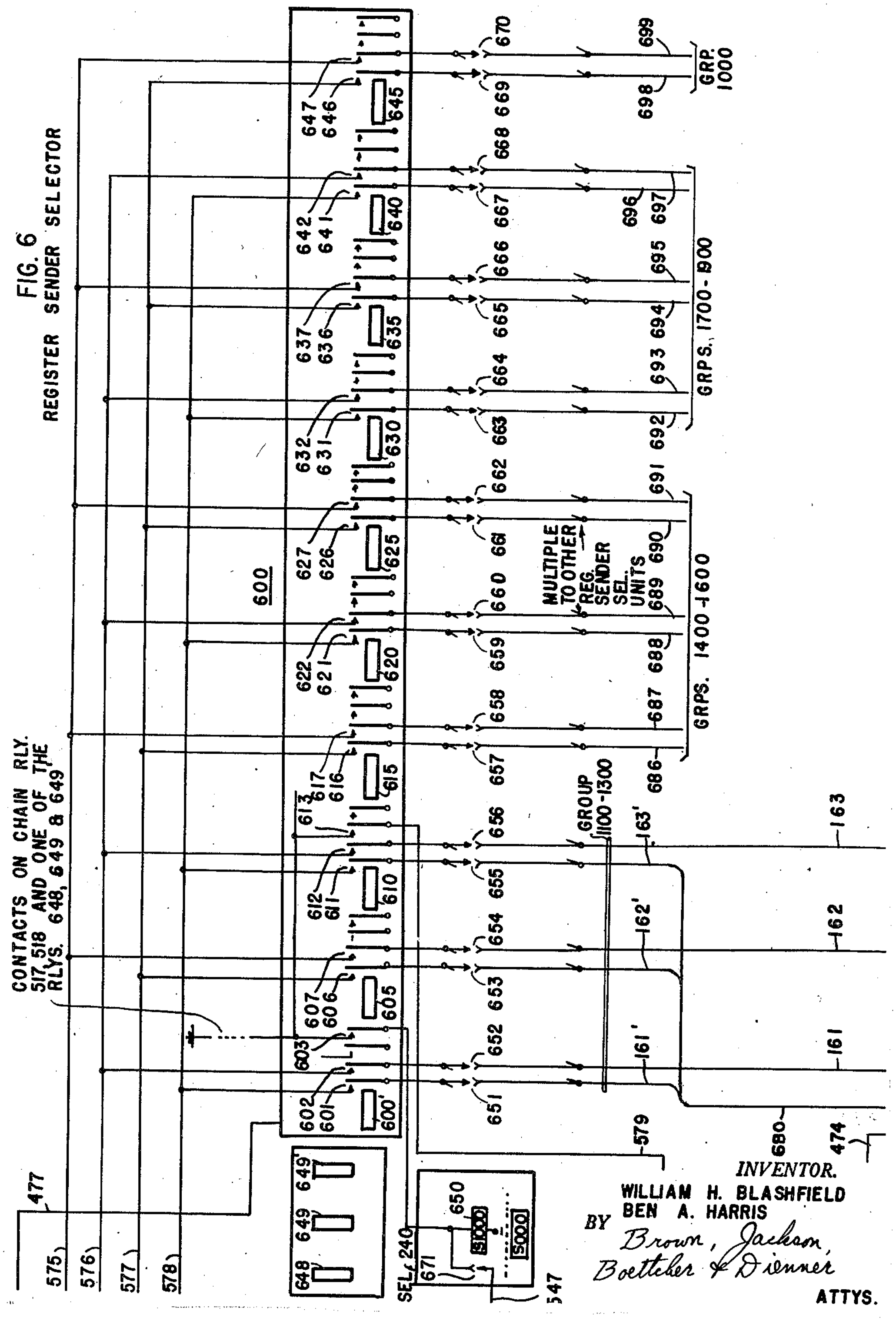

As the fourth counting chain relay 513 operates, it completes an operating circuit for the thousand selection relay which is associated with the particular one of the relays in the counting chain 600 which is operated at this time. Inasmuch as the second digit of the calling party number comprised a single impulse, the first relay 600′ of counting chain 600 has been operated at this time, and an operating circuit is completed for the first thousand relay 650 by reason of the operated condition of the first counting chain relay 600′. As schematically indicated in Figure 6, the operating circuit for the first thousands relay 650 extends from negative battery over the winding of relay 650, contacts 603, contacts on the fourth chain relay 513 and on the operated one of the sequence relays 648, 649 and 649′.

The first thousands selection relay 650 operates, and at its contacts 671 prepares a self-locking circuit in series with busy test relay 540, which circuit is shunted until the original operating circuit for the first thousands relay 650 is interrupted by restoration of the counting chain 600.

The particular one of the thousands selection relays which operates (in this example first selection relay 650), is also operative at a set of contacts (not shown) to complete an operating circuit for the chain release relay 526 which effects restoration of the operated ones of the counting chain relays (in this example 600′ and 649′), which relays in restoring effect interruption of the energizing circuit for the operated one of the thousands selection relays (in this example 650).

The prepared series circuit for busy test relay 540 and the operated thousands selection relay 650 now becomes effective, such circuit extending from negative battery over the winding of thousands selection relay 650, contacts 671, conductor 547, contacts 508, 512, and the winding of relay 540 to ground.

Busy test relay 540 operates and at its contacts 541—544 interrupts the circuits extending over the contacts of the relays 600′—645 in counting chain 600 to the check connector 160; and at its contacts 546 completes an obvious operating circuit for the associated test relay 535. Busy test relay 535 operates, and at its contacts 537, 539 prepares operating circuits for the idle-connector selecting relays 520 and 527 respectively.

It is apparent that at this time the equipment has selected the thousands group with which the calling line is associated and the equipment is prepared to select and seize an idle connector.

F. THIRD DIGIT OF CALLING NUMBER

The calling subscribed now dials the third or hundreds digit of his assigned directory number (in the present example, digit 3), which causes the equipment to test for and, if available, seize an idle check connector associated with hundreds groups 1—3, such as illustrated connector 160.

Briefly, as the recorder line relay 400 operates, a series operating circuit is completed for recorder pulsing relay 470 and digit following relay 440 and in turn 450. With reference to Chart I, it is apparent that with the operation of digit following relay 450 at this time, the third relay 515 of the digit counting chain 235 is restored and the fourth counting chain relay 513 is held operated.

With reference to Chart II, it is apparent that the three incoming impulses representative of the third digit of the calling party number will effect advancement of the chain to the third relay 610 thereof, the third chain relay 610 and its associated sequence relay 648 being in the operated condition as the last impulse of the three incoming impulses is received.

As digit following relays 440 and 450 restore after the elapse of a predetermined period of time following receipt of the last impulse of the hundreds digit (with reference to Chart I), an operating circuit is completed for the fifth relay 510 of the digit counting chain 235.

As noted earlier herein, there are two check connectors such as illustrated connector 160 assigned to each three hundred lines such as 1–3, 4–6, 7–9, and to the last hundred lines in the system, each of these test connectors being connected for access by any of the register-sender-selectors such as the illustrated unit 230. As the fifth counting chain relay 510 is operated following receipt of the third digit of the calling number, a test is made to determine the busy or idle condition of the two check connectors associated with the three hundred lines which include the hundred lines indicated by the hundreds digits received. (Connectors 160, 164 in the present example.)

Briefly, the fifth relay 510 of counting chain 235 operates, and at its contacts 511 completes a secondary holding circuit for the operated one of the thousands selection relays (in this example the first thousands relay 650), and at its contacts 512 interrupts the energizing circuit for the busy test relay 540, which restores and at its contacts 546 interrupts the energizing circuit for its associate busy test relay 535.

The associate busy test relay 535 is sleeved and slugged, and accordingly an appreciable period of time elapses prior to the restoration thereof. The first busy test relay 540 restores quickly and during the period that the first busy test relay 540 is restored and the second busy test relay 535 is operated, a testing circuit is completed to the two check connectors 160, 164, associated with the first three hundred group of lines in the first thousands group. It is noted that one or both of the test connectors may be engaged by different senders associated with different groups of recorders (such possibility being apparent with reference to the showing of Figures 1, 2, 3 and 9) and accordingly, it is necessary to check for the accessibility thereof as the call proceeds to the point where a check connector is required.

An important feature of the invention is the manner in which this check for the busy condition of the check connectors is accomplished over a single conductor, and in fact the same single conductor which forms a part of the connection which is eventually established back to the calling line. Further, as shown hereinafter, the seizure, the dialling functions to the test connector, and the tone test are accomplished over the same conductor. As mentioned heretofore, each test connector may be seized over three different paths, the particular path used in each case being adapted to provide the fundamental function.

The four purpose conductor for the first test connector 160 in the present example is conductor 163, in that the hundreds digit is three and the third counting chain relay is in the operated condition at this time. The test conductor 163' provides similar service for the second check connector 164 in this example. Assuming initially that both connectors are idle as the test relay 540 restores and test relay 530 remains in the operated position due to its slow to release characteristics, the following test circuits are completed to the test connectors 160, 164:

*a.* In the first connector 160, negative battery, the winding of seizing relays 750, resistor 751', C163, contact 656, 612, C576, contacts 542, 537, 523 and test relay 520 to negative battery.

*b.* In the second connector 164, negative battery, the winding of seizing relay 750', resistor 751'', C163', contacts 655, 611, C578, contacts 544, contacts 539, 528, and relay 527 to negative battery.

Thus, if a check connector is idle, negative battery is connected to the test relays 520 and 527 as the test is made by relays 535 and 540. Since the opposite end of the winding of these relays are connected to negative battery, with these existing conditions no relay operation is effected. As will be shown in more detail hereinafter, ground will be found connected to test lead 161—163, 161', 163' at points PA, PB and PC whenever the associated connectors are busy, whereby the test relays 520 and 527 will be operated to provide indication of such condition to the equipment. As will be shown hereinafter, the ground that is connected to the test conductors, such as 163, 163', may be steady or pulsating, and accordingly, the interval of time between the dropping of the first test relay 540 and the second test relay 535 is made sufficiently long to operate the corresponding test relay 520, 527 even though a pulsating ground is encountered.

Assuming first that both connectors are busy, ground will be connected to both of the test conductors at points PC and the test relays 520 and 527 will operate over the circuits above described. Test relay 520 locks to ground over contacts 524 and relay 527 locks to ground over contacts 529.

With the operation of both test relays 520 and 527, an operating circuit is completed for blocking relay 460, the circuit extending from negative battery over the winding of relay 460, contacts 418, conductor 475, and contacts 531, 525 to ground. Relay 460 operates and at its contacts 466 completes an obvious self holding circuit; at its contacts 461 and 462 opens the circuit to the trunk selector 260 to restore same; at its contacts 463 connects busy tone to the negative conductor 407 which extends back to the calling party substation; at its contacts 465 interrupts a circuit to the tape punch magnet; and at its contacts 464 completes an operating circuit for recorder relay 420.

Recorder relay 420 operates and at its contacts 425 interrupts the holding circuit for the sender connect relay 410 to effect the restoration thereof and the release of the sender equipment, and at its contacts 426 completes a self-holding circuit extending over contacts 432 to ground. The equipment restores in the conventional manner responsive to restoration of the handset to the substation by the calling party, all holding grounds in the recorder originating at contacts 431 and 432 of relay 430.

In the event that both the check connectors 1 and 2 are in the idle condition as the test relay 535 and 540 initiate the test, it is apparent that ground will not appear on either of the test conductors 163, 163' and accordingly, neither one of the test relays 520, 527 will operate. After the elapse of a predetermined period of time determined by the operating characteristics of the slow-to-release relay 535, the relay 535 restores and at its contacts 536 extends the test connection from the recorder through the selector to the first check connector 160 to seizing relay 750 therein, the operating circuit extending from negative battery over the first seizing relay 750,500 ohm resistor 751', conductor 163, contacts 612, conductor 576, contacts 542, contacts 536, 521, 503, C476, contacts 473, and 419 to ground. It is apparent therefor that if both connectors are idle, the first connector of the pair is assigned for use (connector 160 in the present example).

In the event that the first check connector 160 is idle, and the second check connector 164 is busy, it will be apparent that negative battery will exist on conductor 163 and ground will be connected to conductor 163'. Accordingly, relay 527 will operate and relay 520 will remain restored, and the first seizing relay for the check connector 160 will be operated over the path just described. Relay 527 locks up without accomplishing an effective function at this time. Thus, if the first connector is idle and the second connector is busy, the test relays 520, 527 assign the first connector 160 for use.

In the event that the first check connector 160 is busy and the second check connector 164 is idle, it is apparent that ground will be present on conductor 163 and negative battery will be connected to conductor 163'. As the test is made by relays 535 and 540, test relay 520 operates, and relay 527 remains restored. Relay 520 operates and locks over contacts 524; and at its contacts 522 completes an energizing circuit for the seizing relay 750' associated with the second connector 164, the circuit extending from negative battery over the winding of relay 750', resistor 751'', conductor 153', contacts 611, conductor 578, contacts 544, 538, 522, 503, conductor 476, contacts 473 and 419 to ground. It is apparent therefore that if the first check connector 160 is busy and the second check connector 164 is idle, the test relays 520, 527 assign the second connector for use.

The foregoing examples set forth the manner in which a check connector would be seized in the event that the calling subscriber was in the third "one hundred" group of lines in the first one thousand group of lines. There will be set forth briefly the manner in which a check connector such as 160 would be seized if a calling line was associated with the second hundred line group in the first one thousand group of lines (line 21222 for example), and as a further example, if the line is in the first one hundred group of the first one thousand group of lines (21122). It will be assumed that in each instance the first connector 160 of the group is idle.

If the calling subscriber directory number is 21122, the "hundreds" digit dialled by the calling subscriber will be "1," and the first relay 600' of chain 604 will be in the operated condition as the last and only impulse of the hundreds digit is received. Accordingly, the path for seizing connector 160 if idle will extend over the contacts of relays 650 and 600' to the incoming path 161 for the test connector whereby seizing relay 750 and 760 in the selector will be operated. The seizing circuit specifically extends from negative battery over the winding of relay 750, the winding of relay 760, incoming path 161, contacts 652, contacts 602, conductor 576, contacts 542, 536, 521, 503, conductor 476, and contacts 473 and 419 to ground.

It is apparent that if the first check connector were busy, test relay 520 would be operated, and accordingly the second check connector 164 would be assigned for use. In such event connector relays 750' and 760' are operated in series, the circuit extending from negative battery over the winding of relay 750' the winding of relay 760' conductor 161', contacts 651, 601, conductor 578, contacts 544, 538, 522, 503, conductor 476 and contacts 473 and 419 to ground.

In the event that the calling party assigned directory number is 21222, it is apparent that the hundreds digit dialled by the calling subscriber would be "2," and accordingly the second relay 605 of chain 600 will be in the operated condition as the last impulse of the hundreds digit is received. Accordingly, the seizing circuit of the first check connector (if idle) will extend from negative battery over the winding of seizing relay 750, the winding seizing relay 755, conductor 162, contacts 654, 607, conductor 575, contacts 541, 536, 521, 503, conductor 476 and contacts 473 and 419 to ground.

In the event that the first connector 160 is busy, and the second connector 164 is idle, test relay 520 will be in the operated condition, and the second check connector 164 will be seized over the circuit extending from negative battery over the winding of seizing relay 750', the winding of relay 755', conductor 162', contacts 653, 606, conductors 577, contacts 543, 538, 522, 503, conductor 476, and contacts 473 and 419 to ground.

It is apparent from the foregoing that the system includes two test connectors for each set of three hundred lines, and that each of the test connectors may be accessed over one of these paths, the particular one hundred group of lines desired determining the particular path over which the seizure is effected. The manner in which the check connector selects three lines of the three hundred lines, and how the desired line of the three is selected will now be more fully described.

The description of the call initiated by the calling party having directory number 21322, will be contained hereat, it being assumed that the first check connector 160 was in the idle condition, and that the check connector 160 has been seized over conductor 163, whereby seizing relay 750 therein is in the operated condition.

As the seizing relay 750 in test connector 160 operates, it is effective at its contacts 751 to complete an obvious operating circuit for hold relay 770, which operates and at its contacts 771 prepares an operating circuit for digit following relay 775, and the connector counting chain 700 comprising relays 700'—745.

The operation of the chain members is similar to that of a chain in a conventional connector switch, and is accordingly shown in schematic form. Drive conductor 799 for the counting chain 700 is controlled by the seizing relay 750, the manner of its control being more fully disclosed at this point.

G. FOURTH DIGIT OF CALLING NUMBER

As the calling party now dials the fourth or tens digit "2" of his assigned directory number, the check connector advances in search of the second tens group of lines associated with the first, second and third hundreds group selected responsive to receipt of the hundreds digit (three in the present example). It will be remembered that as a result of the dialling of hundreds digit "3," the test connector 160 was seized over incoming path 163 and accordingly seizing relay 750 alone of the three seizing relays will respond to the incoming impulses transmitted thereto by the recorder 200 via register-sender-selector 230.

Specifically, the recorder line relay 400 responds to the two impulses transmitted by the calling subscriber, and at its contacts completes an energizing circuit for the recorder pulsing relay 470 in series with the digit following relay 440 which operates 450. With reference to Chart I, it will be apparent that the recorder digit following relay 450 is effective in its operation responsive to receipt of the first impulse of the tens digit of the calling party number to effect restoration of the fourth chain relay 513 in the digit counting chain 235.

Recorder pulsing relay 470 transmits the impulses representative of the tens digit as received from the calling subscriber to the seizing relay 750 in the seized check connector 160 over a circuit which extends from negative battery over the winding of relay 750, resistors 751', conductor 163, contacts 656, 612, conductor 576, conacts 542, contacts 536, 521, 503, conductor 476, and contacts 473 and 419 to ground. Recorder pulsing relay 470 a its contacts 473 effects opening and closure of the circuit to the seizing relay 750 in the check connector 160 to effect the pulsing thereof.

As the seizing relay 750 restores responsive to receipt of the first break period of the first impulse, it is effective at its contacts 752 to complete an energizing circuit to the connector digit following relay 775, and at its contacts 751 interrupts the holding circuit for associate relay 770 which being slow-to-release remains energized. Seizing relay 750 at its contacts 752 also connects ground to the counting chain drive conductor 779 to advance same in accordance with the indications provided on the following chart:

CHART III

| | | | | | |
|---|---|---|---|---|---|
| 1st Pulse | 470 | 700 | -------- | -------- | -------- |
| | (470) | -------- | 739 | -------- | -------- |
| 2nd Pulse | 470 | 704 | -------- | -------- | -------- |
| | (470) | -------- | 729 | (700) | (739) |
| 3rd Pulse | 470 | 710 | -------- | -------- | -------- |
| | (470) | -------- | 719 | (704) | (729) |
| 4th Pulse | 470 | 715 | -------- | -------- | -------- |
| | (470) | -------- | 739 | (710) | (719) |
| 5th Pulse | 470 | 720 | -------- | -------- | -------- |
| | (470) | -------- | 729 | (715) | (739) |
| 6th Pulse | 470 | 725 | -------- | -------- | -------- |
| | (470) | -------- | 719 | (720) | (729) |
| 7th Pulse | 470 | 730 | -------- | -------- | -------- |
| | (470) | -------- | 739 | (725) | (719) |
| 8th Pulse | 470 | 735 | -------- | -------- | -------- |
| | (470) | -------- | 729 | (730) | (739) |
| 9th Pulse | 470 | 740 | -------- | -------- | -------- |
| | (470) | -------- | 719 | (735) | (729) |
| 10th Pulse | 470 | 745 | -------- | -------- | -------- |
| | (470) | -------- | 739 | (740) | (719) |

Connector digit following relay 775 holds operated for the period of receipt of the impulses which represent each digit.

Inasmuch as it has been assumed that the tens digit of the calling party number is "2," the connector chain 700 will have been advanced to the second relay 704 as the last impulse of the series is received. Sequence relay 729 and chain relay 704 will be in the operated position (see Chart III above). Connector seizing relay 750 will be maintained operated over its original seizing circuit.

After the elapse of a predetermined period of time following receipt of the last impulse representing the tens digit, connector digit following relay 775 restores and recorder digit following relays 440 and 450 restore.

Recorder digit following relay 450 in restoring is effective (as shown in Chart I) to operate the sixth relay 506 of the digit counting chain 235 which opens a further point in the circuit of relay 540 and provides an alternate holding circuit for relay 650. The connector digit following relay 775 in restoring is effective at its contacts 777 to complete an operating circuit for the selected one of the connector tens selection relays, which in the present example will be the second selection relay 780. It is apparent that if the tens digit had been "1," the first counting chain relay 700 would be energized at this time and the first tens selection relay (not shown) would have been operated. If the tens digit had been "3," the third counting chain relay 710 would be energized, and the third tens connector selection relay (not shown) would have been operated, etc. It is noted that each selection relay, such as 780, is effective at its contacts 781—818 to select the same group of ten lines in each of the three hundred groups associated with the seized connector switch, (that is, select relay 780 in operating selects lines 121—120, 221—220 and 321—320).

Thus the tens relay in the illustrated connector instead of extending three conductors for each line of a group of ten is operative to extend a single conductor for each line of an associated group of tens lines in each of three different hundred line groups.

As the connector selection relay 780 operates, it is also effective at its contact 780′ to lock to ground over an obvious circuit including a tens sequence relay (not shown), and effects reset of the connector counting chain 100 over contacts (not shown) in the manner of a conventional switch. Locking ground is under control of connector relay 770 over contacts 771′.

The equipment at this time has set up a connection to the thousands group in which the calling line is located, has selected the three hundred lines which includes the calling line, and has selected the same tens group of lines in each of the three-one hundred line groups selected. Briefly, the selection has been narrowed down to thirty lines.

H. FIFTH DIGIT OF CALLING NUMBER

As the calling party now dials the fifth or units digit of the assigned directory number (in the present example "2"), the equipment effects selection of the particular line of the thirty lines selected at this time.

Briefly, the line recorder relay 400 operates in response to receipt of the two impulses which are representative of the units digit, and in its first operation responsive thereto effects operation of the recorder pulsing relay 470 and the recorder digit following relay 440 which operates 450. With reference to Chart I, it is apparent that digit following relay 450 in its operation is effective at contacts 443 to effect the restoration of the fifth relay 510 of the digit counting chain 235.

Pulsing relay 470 follows the incoming pulses, and at its contacts 473 repeats same to the operated one or ones of the seizing relays in the check connector 160 (seizing relay 750 in the present example).

Seizing relay 750 operates in response to the impulses received from the recorder, and in its first response thereto effects operation of digit following relay 775 which holds during the receipt of the impulses representing the units digit; and at its contacts 752 effects repetition of the pulses over counting chain control conductor 779 to effect operation of the connector counting chain relay 700′—745 in the conventional manner.

With reference to Chart III, it is apparent that the second counting chain relay 704 and sequence relay 729 will be operated following receipt of the second and last impulse of the units digit impulses whereby the lines having directory numbers 21322, 21222, and 21122 will have been selected from the thirty line group selected by connector relay 780.

At this time the seizing relay 750, the connector tens relay 780, digit following relay 775 and the second counting chain relay 704′ in the connector are operated. After the elapse of a predetermined period of time, the connector digit following relay 775 restores, and at its contacts 776 completes an operating circuit for connector control relay 765 which includes contacts of a tens sequence relay and contacts on certain ones of the counting chain relays to holding ground.

As the connector control relay 765 operates it is effective at its contacts 766—769′ to extend the effective one of the incoming paths to the desired one of the three lines selected, the selection of the proper incoming path being determined by the particular one or ones of the seizing relays 750, 755, 760 which are operated at this time. It is apparent that with relay 750 in the operated condition (as a result of the third one-hundred line group being designated), the P-wire for the calling line 21322 will be prepared for extension to conductor 163. With the operation of relay 765 conductor 163 is extended to the P-wire of line 21322 over contacts 759, 764, condenser 777′, contacts 769′, 762, 757, 707, 786, conductor 474 and the B-wiring. If the hundreds digit dialled is "2" seizing relay 755 operates in series with relay 750 and the second incoming path 162 will be extended through the connector to the P-wire of the second line (21222) of the three lines selected, the circuit extending from incoming path 162 over contacts 758, 764, condenser 777′, contacts 769′, 762, 756, 706, 785 to the single conductor which extends to the P-wire of the line having directory number 21222.

If the hundreds digit dialled were "1" the seizing relays 750 and 760 would have been operated in series and the incoming path 161 would have been extended to over contacts 763, condenser 777′, 769′, 761, 705 and 784 to the P-wire for the line having directory number 21122.

It is seen from the foregoing description that a progressively decreasing selection of lines is accomplished with the receipt of each incoming digit, the final selection being effected by the particular ones of the seizing relays in the seized connector switch which are operated as the last digit is received. Inasmuch as it was assumed that the calling party has accurately dialled his assigned directory number (21322), the single conductor extends to the P-wire 408 of the calling party.

It will be recalled that the extension of the connection through the connector is accomplished as a result of the restoration of the connector digit following relay 775 and the operation of check connector control relay 765. It should be noted that when the digit following relay 400 in the recorder reoperates following receipt of the two pulses which comprise the fifth digit of the calling directory number, the circuit of recorder relays 470 and 440 are opened. Relay 770 releases in turn reoperating check connector relay 750. Relay 750 operates sequence relay 729 which releases relays 700 and 739 and opens the circuit of slow-release relay 775. After the elapse of a predetermined interval, relay 775 restores to operate relay 765, which in turn extends the called P-wire to contacts of relay 500. An interval after the opening of its circuit slow-to-release recorder relay 440 releases, in turn opening the circuit of slow-to-release relay 450. After the elapse of a predetermined time period, relay 450 releases operation relay 500 in series with relay 506. The operation of relay 500 occurs subsequent to the operation of relay 765, and in its operation tests the accuracy of the identification number dialled by the calling party.

That is, as digit counting relay 500 operates, it is effective at its make-before break contacts 503—504 to interrupt the connection extending from the recorder to the P-wire selected, and at its contact 504 connects the selected P-wire to terminal B in the check tone circuit 255.

The seventh counting chain relay 500 is also effective at its make-before-break contacts 501—502 to effect insertion of the impedance coil 455′ in the holding circuit for the first selector, line finder and line circuit 407. The operated ones of the connector seizing relays are held operated by this same ground, the circuit specifically extending from negative battery over the winding of the operated ones of the seizing relays (750 in the present example), resistor 751′, conductor 163, contacts 656, contacts 612, conductor 576, contacts 542, 536, 521, and 504, conductor 568 to terminal B in the check tone circuit 255, the loop therethrough, terminal A, C567, contacts 502, coil 455′, conductor 456 and contacts 411 to ground. Finally, the connection of ground over coil 455′ to the check tone circuit 255 initiates the check tone test, reference being made to the aforeidentified copending application for the details of operation of the check tone circuit.

It is apparent that if the calling party has accurately dialled his assigned directory number, a loop external to the tone circuit will have been completed across the A and B terminals of the check tone unit 255, and the check tone applied thereto by the circuit will provide a positive test. If a positive test is experienced the tone circuit does not provide a signal over conductor 569 to the equipment. However, if with application of the check tone to the circuit, the check circuit 255 determines that the loop has not been properly completed through the equipment, as a result of the calling party not dialling his own directory number, the check tone circuit connects a ground signal to terminal C to indicate to the equipment that the calling party has not accurately dialled his assigned directory number and that the call should be blocked. As shown by the heavy lines on the drawing, the external loop completed across terminals A and B by the equipment if the party has accurately dialled his own number extends as follows: Terminal B, conductor 568, contacts 504, 521, 536, 542, conductor 576, contacts 612, 656, conductor 163, contacts 759, 764, capacitor 777′, contacts 769′, 762, 757, 707, 786, conductor 474, to the P-wire of the calling subscriber having directory number 21322, over the closed contacts 469, 489 of the operated ones of the line finder tens and units relays, the closed contacts 437, 447 of the selector units and thousands relays in selector 120 of link 110; over P-wire 408 to the recorder and contacts 492, 441, 423, 482, conductor 455, contacts 502, and conductor 567 to terminal A of the check tone circuit 255.

The path of the loop for the other subscribers as they accurately dial their assigned directory number in the establishment of a call and the manner in which it will vary as various busy switch conductors are encountered will be apparent from the foregoing description.

As the seventh chain relay 500 of digit counting chain 255 operates to initiate the operation of the check tone circuit 255 it is also effective at its contacts 505 to complete an obvious operating circuit for tape control relay 550, which operates and at its contacts 552 extends the marking conductor 569 from the check tone circuit 255 to the blocking relay 460, and at its contacts 553 closes an operating circuit as in the aforedescribed appliaction to cause the step magnet to take four steps to separate the calling and called numbers on the tape.

It will be recalled that if the check tone circuit 255 finds that the loop external to its terminals A—B is not completed, ground is placed upon marking conductor 569, and as relay 550 operates, such ground is transmitted to the recorder over a circuit extending from the tone circuit 255 over conductor 569, contacts 552, conductor 475 and over contacts 418 and the winding of relay 460 thereat to negative battery to effect the operation thereof.

Blocking relay 460 operates and at its contacts 466 completes an obvious self holding circuit, and at its contacts 464 completes an operating circuit for recorder relay 420. Relay 420 operates and at its contacts 426 locks to ground over contacts 431 and 432; and at its contact 425 interrupts the holding circuit for the sender connect relay 410 to effect the release of the seized one of the register-sender-selectors 230 and in turn the seized check connector 160.

Blocking relay 460 at its contacts 461 and 462 releases the outgoing connection and at its contacts 463 effects the application of busy tone to the calling subscriber line to indicate to him that his assigned directory number was improperly dialled and extension of the call is blocked by the equipment in the manner set forth in the copending application.

Assuming that the check tone test was positive, and that no ground was connected to conductor 569 by the tone circuit 255, as the control relay 550 operates it is effective at contact 553 to connect the tape step magnet to the sender 250 whereby the tape magnet is pulsed to effect advancement of the tape four steps to thereby separate the calling and called numbers on the tape. At its contacts 551 relay 550 completes an operating circuit for the associate relay 555 to the sender 250. When the sender has caused the tape step magnet to take the required number of steps, the sender connects ground through contacts 551 to relay 555.

Control relay 555 operates, and at its contacts 557 completes an operating circuit for sender-release relay 420, the circuit extending from negative battery over the winding of relay 420, contacts 415, conductor 474 and contacts 557 to ground. Sender-release relay 420 operates, and at its contacts 426 locks over contacts 432 to ground and at its contacts 425 interrupts the holding circuit for the sender connect relay 410 to effect the restoration thereof. Sender connect relay 410 restores to effect release of the seized register-sender-selector 230 and the seized check connector 160; and at its contacts 411 interrupts the holding grounds for the register-sender-selector equipment.

Sender-release relay 420 at its contacts 421 and 422 extends the calling loop to the trunk selector 260 via capacitors 406 and 407. The calling party now dials the number of the desired subscriber number. It is noted that the dialling loop extends from the subscriber substation set over the loop which has been established over the line finder 115 and selector 120 of seized link 110 to the line relay 400 of recorder 200, the capacitors X and Y inserted in conductors 406 and 407 preventing extension of the D. C. loop over the connection which now extends to the trunk selector 260. Accordingly, as the party dials the called party number, the recorder line relay 400 is pulsed and its contacts 402 in turn pulses the recorder pulsing relay 470 in series with the digit following relay. Relay 440 and in turn 450 operate at this time, and hold for the duration of each series of impulses which represent a digit and although relays 440 and 450 operate without effect as to the register-sender-selector 230 in that the connections thereto have been interrupted by the restored order connect relay 410, relay 440 is effective at its contacts 442 to connect the calling party P-wire 408 to ground independent of recorder relay 420. The equipment is thus prepared for release as the calling party restores.

The recorder pulsing relay 470 follows the incoming impulses of each digit of the called number, and at its contacts 471 extends the pulses over outgoing conductors 478 and 479 to trunk selector 260, the pulsing circuit specifically extending from the positive conductor 478 over contacts 461, 429, 471, the winding of coil 405, and contacts 462 to the negative conductor 479 which extends to the trunk selector 260.

It is noted that the present arrangement includes a low tape relay 480 which has not been taught in the previous application, the relay being held operated over a cam member which opens as the tape on the roll falls below a predetermined level to thereby release relay 480.

As low tape relay 480 restores, it is effective at its contacts 481 to place ground on the incoming P-wire, whereby the recorder is made busy to the first selectors, and at associate contacts 485 activates an alarm circuit to inform the attendant of such condition.

The connection is completed by the switching equipment at the distant exchange in the normal manner, and as the calling subscriber answers the link between the two subscriber sets is completed.

*Release*

When the calling party restores his receiver at the end of a call, the recorder line relay 400 restores, and at its contacts 401 interrupts the holding circuit for the associate hold relay 430, which is slow-to-release, and accordingly remains operated for a brief period of time thereafter. Recorder line relay 400 at its contacts 402 completes an operating circuit for digit following relay 440, and pulsing relay 470 in series. Relay 440 is in turn effective at its contacts 443 to complete an operating circuit for associate relay 450.

As relay 430 restores after elapse of the predetermined time period, it removes ground from the incoming P-wire 408 releasing the line-finder-selector link 110 and line circuit 407. Relay 430 is effective at its contacts 432 to interrupt the energizing circuit for sender restoring relay 420 which restores. At its contacts 427, relay 420 interrupts the energizing circuit for the digit following slow release relay 440 to effect the restoration thereof, and at its contacts 428 completes an operating circuit for the release relay 490, the circuit extending from negative battery over the winding of relay 490, contacts 451, 434, 428, and 402 to ground. Release relay 490 operates, and at its contacts 492 connects ground to the P-wire 408 which rebusies the recorder to the selector multiple, and at its contacts 493 interrupts the holding circuit for the associate slave relay 450 to effect the restoration thereof after the elapse of a predetermined period of time which is determined by its slow-to-release characteristics. As relay 450 eventually releases, it is effective at its contacts 451 to interrupt the holding circuit for release relay 490 which restores slowly by reason of the RC circuit comprised of capacitor 495 and resistor 496.

During the period that the release relay 490 is operated, a circuit is closed over contacts 494 via interrupting contacts for the tape step magnet which causes the magnet to run off a predetermined number of intercall spaces on the tape. Relay 490 restores, and at its contacts 494 interrupts such circuit; at its contacts 491 connects the P-wire for control by the contacts on sender connect relay 420 (which is also restored at this time), thus interrupts the ground extending back to make the recorder busy to the selector multiple. With relay 420 released, the loop to the trunk selector is opened.

*Busy test*

As was indicated earlier in the description, each register-sender-selector, such as the illustrated unit 230, has access to each three hundred subscriber lines over each of three levels, such as 161, 162, 163, which comprised incoming paths for each of two check connectors, such as 160, 164. As previously noted, in the event that one of the connectors is busy, ground is connected to each of these levels to mark the connector busy to attempted seizure by other register-sender-selectors.

The manner in which this busy indication is provided to the register-sender-selectors, is set forth in more detail hereat. With specific reference to Figure 9, there is set forth in schematic block form two recorders 200′ and 200 of two different groups, each of which has access to an associated register-sender-selector 230′ and 230 respectively. As heretofore mentioned, each of the check connectors such as illustrated connectors 160, 164 are assigned to handle three hundred lines in the exchange, and accordingly, it is apparent that all of the register-sender-selectors will have access thereto.

It will be assumed that a subscriber in the first hundred group has caused the illustrated recorder 200′ of the first group of recorders to seize the register-sender-selector unit 230′ in the manner described heretofore, which unit has, in turn, seized the first check connector 160 over incoming path 161. It is further assumed that a subscriber in the third hundred group of lines now initiates a toll call and operates the illustrated equipment and attempts to seize test connector 160 over the illustrated recorder 200 and register-sender-selector 230. The check connector 160 in such event provides a busy indication to the register-sender-selector 230. In similar manner the associated test connector 164 is tested as to its availability.

That is, with reference to Figure 9, it will be apparent that as the test relays 535 and 540 connect the incoming path 163 to the test relay 520 in the register-sender-selector 230, an operating circuit will be completed for test relay 520 to indicate the busy condition of the check connector 160 thereto, the circuit specifically extending from negative battery over the winding of relay 520, contacts 523, 537, 542, conductor 576, contacts 612, 656, conductor 163, and resistor 751′, over the winding of seizing relay 760 to the ground which has been placed on conductor 161 by the recorder 200′ and register-sender-selector 230′, which have previously seized the check connector 160 for use. Normally, the ground will be connected thereto over contacts 652′ on the selector thousand relay (S1000 in the present example), contacts 607′ (the desired subscriber being in the first one hundred group), contacts 542′, 536′, 521′, 503′, conductor 476′, and contacts 473′ and 419′ to ground. The test relay 520 in the register selector 230 will operate therefore to indicate to the testing equipment that the check connector 160 is in the busy condition. It is apparent that if recorder 200′ is pulsing relay 750 of check connector 160, the ground applied to this circuit via register-sender-selector 230′ will be of a pulsating nature, and accordingly the test relay 535 has been provided with operating characteristics which permit operation of the test relays 520 or 527 should the pulsating ground be encountered.

The manner in which a busy check connector, such as 160, provides ground at other times over the several incoming paths to the testing equipment of searching register-sender-selector units will be apparent from the following brief circuit disclosures.

Assuming that the second check connector 164 of the group 160, 164 is busy as a result of the seizure thereof by the recorder 200′ and register-sender-selector 230′; and that the recorder 200 and register-sender-selector 230 are testing same for use over the illustrated third level, the circuit for providing ground to conductor 163′ will be as follows: negative battery, relay 527, contacts 528, 539, 544, conductor 578, contacts 611, 655, conductor 163′, resistor 751′, the winding of seizing relay 760′, conductor 161′, contacts 651 of the selector relay 650′ (corresponding to S1000), contacts 601′, conductor 578′, contacts 544′, 538′, 522′, contacts 503′, conductor 476′ and contacts 473′, 491′ to ground.

In the event that the check connector 160 is busy as a result of the seizure thereof over incoming path 161 by a first subscriber, and a second subscriber is attempting to seize the check connector 160 over the second incoming path 162, the busy test path will be as follows: conductor 162, coil of seizing relay 755, resistor 751′ and conductor 161 to the ground placed thereupon by the recorder and register-sender-selector equipment which has seized same for use.

In the event that the check connector, such as 160, has been seized over conductor 161 by a first subscriber, and a second subscriber is attempting to seize the connector 160 over the incoming path 161, the ground would be applied thereto over a direct obvious path.

In a similar manner, if the check connector 160 has been seized over the second incoming path 162, as a second recorder attempts to seize the equipment over the same incoming path, ground will be applied thereto over a direct and obvious path.

In the event that the check connector 160 has been seized over the incoming path 162 by a first subscriber, and a second subscriber attempts to seize same over the first incoming path 161, the busy marking ground applied to conductor 162 by the equipment which has seized same for use will be extended over the winding of seizing relay 755, the winding of seizing relay 760 to conductor 161, and the testing relays of the searching equipment.

In the event that the test connector 160 has been seized over the second incoming path 162, and a second subscriber is attempting to seize same over conductor 163, the busy marking ground placed on conductor 162 by the equipment using check connector 160 will be extended over the winding of relay 755, resistor 751′ to conductor 163 and the testing equipment.

In the event that the check connector 160 has been seized over the third incoming path 163, and a second set of equipment is attempting to seize same over the same path, it is obvious that the busy marking ground will be extended thereto in a direct fashion.

In the event that a check connector 160 has been seized over incoming path 163 by a first set of equipment and that a second set of equipment is attempting to seize same over incoming path 161, the marking ground imposed upon path 163 by the equipment using connector 160 will extend over conductor 163, resistor 751′, the winding of seizing relay 760 to conductor 161 and the testing equipment.

In the event that test connector 160 has been seized over incoming path 163 by a first set of equipment, and a second set of equipment is attempting to seize same over incoming path 162, the marking ground placed on path 163 by the equipment using same will be extending over resistor 751′, the winding of seizing relay 755, to conductor 162 and the testing equipment.

6. *Private branch exchange lines*

Figure 5:
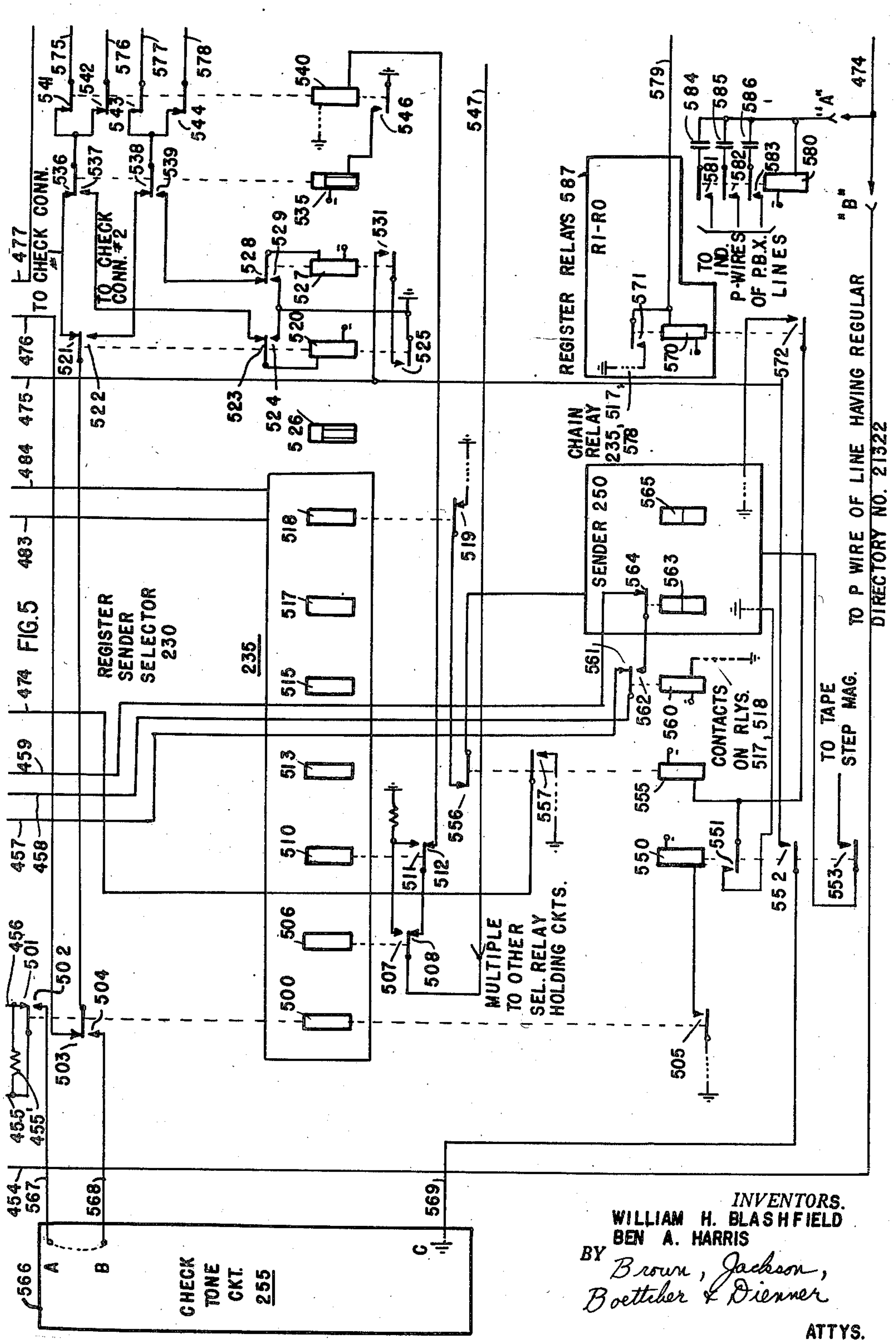

If the system is to be used with P. B. X systems, the arrangement is modified to include "A" wiring (Figure 5). As one of the lines of a group of private branch exchange lines initiates a toll call and transmits the directory P.B.X number (such as 21322) for identification purposes, battery through impedance coil F, contacts 769′, 762, 757, 707, 786, conductor 474, and A-wiring through the coil of relay 583 to ground, operates relay 583.

Control relay 583 operates, and as more specifically shown in Figure 10, is effective at its contacts 581, 582, 583, to connect the P-wire outgoing from the check connector 160 through capacitors 584, 585, 586, to the P-wires the various P. B. X lines having the same group directory number, whereby a tone check path may be established over any one of these lines. The inclusion of such arrangement prevents the extension of a spurious tone through the system. That is, if the P-wires were permanently interconnected by condensers, and a P. B. X party of one group called a P. B. X party of another group, and at least one other P. B. X line had established a call through regular links not guarded by impedance coils in the P-wires, a spurious tone check through the grounded P-wires would enable fraud.

While there has been described what is regarded to be preferred embodiments of the invention, it will be apparent that various changes, rearrangements and modifications may be made therein without departing from the scope of the invention as defined by the appended claims.

What is claimed is:

1. In an automatic switch for extending connections to associated circuits which are divided into groups, a plurality of paths incoming to said switch, each incoming path being associated with a corresponding one of said groups, register means for registering the path over which the switch is seized, means operative responsive to receipt of a first and a second set of control impulses over one of said incoming paths to select one circuit from each of the associated circuit groups, and means operative to connect the individual circuits thus selected to said register means for the purpose of selecting the circuit which is in the group associated with the incoming path over which the control impulses were received.

2. An automatic switch for extending connections to associated circuit groups comprising a plurality of single conductor paths incoming to said switch for seizing same, means operative responsive to seizure of the switch and the receipt of a first and a second set of control impulses over the seizing one of said single conductor incoming paths to select one circuit from each associated group, and means operative to select one circuit of the single circuits thus selected in accordance with the particular single conductor path over which the switch has been seized.

3. An automatic switch for extending connections to associate circuits divided into groups comprising a plurality of paths incoming to said switch, a first group of relays operative responsive to receipt of a first set of control impulses over one of said incoming paths to select a subgroup of said circuits from each group as indicated by said impulses, a second group of relays operative responsive to receipt of a second set of control impulses thereover to select one circuit from each of the selected subgroups, and a third group of relays operative in accordance with the particular incoming path over which the impulse sets have been received to select one circuit of the individual circuits thus selected.

4. An automatic switch for extending connections to each of three hundred associate circuits comprising a plurality of paths incoming to said switch, a group of tens relays operative responsive to receipt of a first set of control impulses over one of said incoming paths to select a group of ten circuits from each of the three one hundred circuit groups as indicated by the received impulse set, a group of units relays operative responsive to receipt of a second set of control impulses to select one circuit from each of the three selected ten circuit groups, and a group of register relays operative in accordance with the particular incoming path over which the impulse sets have been received to effect selection of the desired one of the circuits from the three circuits selected from said ten circuit groups.

5. An automatic selector type switch for extending connections to associated circuits comprising a plurality of single conductor paths incoming to said switch, means operative responsive to application of a seizing potential to one of said paths by associated seizing means to prepare same for a selective switching operation, and means operative responsive thereto to extend said seizing potential over the remaining incoming single conductor paths to indicate the busy condition of the selector switch to other seizing means.

6. An automatic switch connected to have access to a number of single conductor circuits, a single conductor incoming to said switch, means operative with application of a seizing signal to said conductor to prepare the switch for operation, means operative responsive to the receipt of signal impulse sets over said incoming path to select the indicated one of the single conductor paths, and means automatically operative responsive to the termination of receipt of the incoming impulse sets to connect said incoming path thereto.

7. An automatic switch for extending connections to subscriber lines in an automatic telephone exchange including means for connecting same to each of several hundred subscriber lines, a plurality of paths incoming to said switch for seizing and operating same, each seizing path being assigned for use in the seizure of an associated one hundred line group, register means comprising a relay group operative to register the path used for the seizure of the switch, a tens relay group operative responsive to receipt of a first set of control impulses over the seizing one of said incoming paths to select from each of the associated hundred line groups, the tens group indicated thereby; a units relay group operative responsive to receipt of a second set of control impulses thereover to select one circuit from each of the selected tens group; and means operative following receipt of the second set of control impulses to connect the circuits selected thereby to said register means for selection thereby of the circuit having the hundred line designation corresponding to the path used in the seizure of the switch.

8. A switch as set forth in claim 7 in which said switch is connected to have access to three hundred lines and has three incoming paths connected thereto, and in which said register means comprises a set of three seizing relays, means for connecting a first one of said relays for operation with seizure of the switch over a first one of said incoming path, means for connecting the first and the second relays for operation with seizure thereof over the second one of said incoming paths, means for connecting said first and said third relays for operation with seizure of said connector over the third one of said incoming paths; and means controlled by said relays, as operated, to register the path used in seizure of the switch.

9. An automatic switch for use in an automatic telephone exchange connected to have access to a number of subscriber lines comprising a plurality of single conductor paths incoming to said switch, and means operative responsive to receipt of a seizing potential over one of said single conductor paths to extend said seizing potential over the other incoming conductor paths as an indication of the busy condition of the switch.

10. An automatic switch for use in an automatic telephone exchange connected to have access to a number of single conductor lines associated with the exchange subscribers, a single conductor incoming to said switch, means operative with seizure thereof over said single conductor path to prepare the switch for operation, means operative responsive to receipt of impulse sets over said single conductor incoming path to select the single conductor outgoing which is indicated thereby, and means thereafter operative to automatically connect same to the single conductor incoming path.

11. A switch as set forth in claim 10 which includes means for marking said single conductor incoming to said switch busy responsive to seizure thereof.

12. An automatic switch as set forth in claim 10 which includes means in said circuit completed thereover operative to conduct an alternating current tone test signal thereover to the exclusion of direct current impulse signals.

13. In an automatic switch for use in an automatic telephone exchange connected to have access to several hundred single conductor circuits, each of which is connected to an associated subscriber line; a plurality of single conductor paths incoming to said switch, means operative responsive to the application of a seizing potential to one of said incoming paths to prepare the switch for operation and to effect extension of the seizing potential over the other incoming conductors to mark the switch as busy; means operative responsive to receipt of a first set of control impulses over one of said incoming paths to select a group of said single conductor circuits from each hundred group of conductors accessible thereto; means operative responsive to receipt of a second set of control impulses thereover to select one conductor from each of the selected conductor groups; means operative in accordance with the particular incoming path over which the switch has been seized to select one circuit of the single circuits thus selected; and means operative thereafter to connect the single selected outgoing conductor to the single conductor incoming over which the switch was seized.

14. An automatic switch for use in an automatic telephone exchange connected to have access to a number of groups of one hundred lines each, said switch having a number of different seizing paths which is commensurate with the number of hundred line groups associated therewith; register means for recording the path over which the switch is seized; means operative responsive to receipt of impulse sets to select corresponding lines from each of the associated hundred groups; and means in said connector operative responsive to termination of receipt of the incoming impulse sets to connect the lines selected to said register means for extension thereby of the line of the registered hundred group to the one of the paths used in the seizure of the switch.

15. In an automatic telephone system having switching means for establishing connections to a plurality of subscriber lines, a set of selector switches, each of which is connected to have access to an individually assigned group of three hundred lines, three seizing paths for each selector switch, each path being associated with a preassigned one hundred group of said lines preassigned thereto; means for selecting the particular switch and the particular incoming path thereof which is individual to the group which includes the desired line; means in each switch operative with seizure thereof over one of said paths to register the particular path used in the seizing operation; means operative responsive to receipt of the impulses representative of the tens and units digit of the desired line to select the lines of the associated hundreds groups having such designation; and means operative thereafter to connect the line of the hundreds group indicated on said register means to the seizing one of the paths.

16. In an automatic telephone exchange having switching means for establishing connections to a plurality of subscriber lines including a number of selector switches, each of which is connected to have access to three one hundred line groups; a plurality of incoming paths for each of said switches, each path being assigned for use in the extension of a connection to a particular one of the associated hundred line group; means for effecting selection of an idle one of the selector switches having access to the three hundred line group over the associated path which has access to the hundred line group which includes the desired line; means in said switch operative to register the particular path utilized in seizing said switch; means in the switch operative to select a set of lines composed of a ten line group from each one of the one hundred line groups associated therewith responsive to receipt of a first set of control impulses over the seizing one of the incoming paths; means operative to select one line from each of the three selected ten line groups responsive to receipt of a second set of control impulses; and means operative thereafter to automatically connect the one line of the selected three lines associated with the group registered on said register means to the seizing one of the paths.

17. In a toll ticketing system for use in an automatic telephone exchange adapted to serve a plurality of subscriber lines, and in which the calling subscriber dials his own number into the toll ticketing system for identification purposes; a selector switch; means for seizing said selector over a single conductor path incoming thereto; means in said selector switch operative responsive to seizure to mark said single conductor as busy to other equipment attempting to seize same; and means operative responsive to the receipt of impulses representative of the digits of the calling party number over said single conductor to extend a single wire connection through the selector switch and to the calling line.

18. An arrangement as set forth in claim 17 in which certain of the calling lines in the system are associated with the directory number of a private branch exchange group, and which includes means operative responsive to the selection of the one of said private branch exchange group of lines having the said directory number to connect the line outgoing from the connector through condensers to each line of the private branch exchange group.

19. In a toll ticketing system for use in an automatic telephone exchange adapted to serve a plurality of subscriber lines, and in which the calling subscriber dials his own number to the ticketing equipment for identification purposes; a selector switch; a plurality of single conductor paths incoming to said selector switch; means for seizing said selector over one of said single conductor paths; means in said selector operative responsive to receipt of impulse sets representative of the digits of the calling party number to select a single conductor connection which extends to the calling party line; and means operative to connect the seizing one of the single conductor paths to the single conductor path extending to the calling party line.

20. An arrangement as set forth in claim 19 which includes means associated with each incoming path for a selector comprising at least one line relay connected to each of the single wire incoming paths to operate in a pulsing manner responsive to the application and removal of potential to the single conductor by the seizing means.

21. An arrangement as set forth in claim 19 in which said selector includes switch seizing means operative responsive to the application of seizing potential to any one of the paths to prepare the selector for service, and busy test means operative responsive to the seizure of the selector over any one of said paths to extend said seizing potential back over the other of said paths as an indication of the busy condition of the switch.

22. An arrangement as set forth in claim 19 in which said selector includes means for marking the connector as busy to other subscribers by at times extending ground to each of the single conductor paths, and at other times extending pulsating ground thereto; testing means in the seizing means for said selector operative to test the single conductors for the presence of steady ground and alternatively pulsating ground thereon; and means in said selector operative to search for another connector with the detection of either steady ground or interrupted ground on a tested conductor.

23. An arrangement as set forth in claim 22 in which said testing means in said seizing means comprise slow-to-release relay means having a release period which is longer than the interruptions experienced between the applications of potential to the said incoming paths.

24. In a toll ticketing system for use in an automatic telephone exchange adapted to serve a plurality of subscriber lines, and in which the calling subscriber dials his own number to the ticketing equipment for identification purposes; switching equipment including a selector switch; a plurality of conductor paths incoming to said selector switch; means for seizing said selector over one of said single conductor paths by applying a seizing potential thereto; means in said switch operative to mark said single conductor busy to other equipment attempting to seize same by extending said seizing potential over the other of said single conductor paths incoming thereto; means in said selector operative responsive to the receipt of impulses representative of the calling party number to connect the single conductor incoming thereto to a single conductor outgoing which extends to the calling party line; and means for extending a calling loop tone test over said single conductor connection which has been extended from the calling party line through the switching equipment and back to the calling party line.

25. In a toll ticketing system for use in an automatic telephone exchange adapted to serve a plurality of subscriber lines, and in which the calling subscriber dials his own number to the ticketing equipment for identification purposes; switching means including a number of selector switches, each of which is connected to have access to three hundred subscriber lines; a plurality of single conductor paths incoming to each selector; means for seizing the selectors over one of the single conductor paths, the paths utilized in seizure being determined by the directory number of the desired party; means associated with the conductors incoming to each selector operative to mark associated means as to the conductor used in the seizure of the selector; means in the selector operative responsive to the receipt of a first set of control impulses over the seized one of the incoming paths to select a group of ten lines from each hundred lines of the three hundred lines accessible thereto; means operative responsive to receipt of a second set of control impulses over said same single conductor to select three lines from the thirty lines selected; and means in said selector operative to select one of said lines in accordance with the particular path which is marked as having been used in the seizure of the equipment.

26. In an automatic telephone system having switching means for establishing connections to subscriber lines including a number of sets of selector switches, each of which switches is connected to have access to a group of three hundred subscriber lines, each set of said switches being connected to have access to a different three hundred line group; three single conductor paths incoming to each selector switch; means operative responsive to receipt of a control impulse set to effect seizure of an idle switch over one of its single conductor paths by applying a seizing potential thereto; means operative as the switch is seized to mark its single conductor paths busy at times by connecting the seizing potential thereto, and at other times by applying a pulsating potential thereto; means in said seizing means operative to test for the existence of the seizing potential and pulsating potential on the single conductors of each switch in search of an idle switch; and means operative in the event that the single path conductors of each selector of the desired group test busy to block further extension of the call over the system.

27. In an automatic telephone system including a plurality of exchanges, a plurality of subscriber lines in each exchange, means for establishing connections between subscribers of different exchanges including toll ticketing means; means operative to seize said toll ticketing means responsive to the dialling of various preassigned codes; means in the toll ticketing equipment operative responsive to the receipt of the calling party number as dialled by the calling party to extend the connection to the desired exchange, and to automatically repeat same to switching equipment in the local exchange to control same to extend a single conductor connection back to the calling line indicated by the number received; said single conductor path extending means comprising a group of selector switches, each of which is connected to have access to at least three hundred subscriber lines; a plurality of single conductor incoming paths for each selector switch; switching means connected to have access to said paths, each path being assigned for use by the switching means in the seizure of a line in a different hundred group of lines of the three hundred lines associated with the seized selector; means operative to mark the single conductor paths of a switch busy as one path of the switch is seized; means in said seizing means operative to test the single conductor paths of the selectors having access to the desired line in search of an idle switch; means operative to effect seizure of an idle switch over its single conductor path as located; and means in the selector operative responsive to receipt of the impulses representative of the calling party tens and units digits to select a single conductor path extending to the desired one of the calling party lines and to extend the single conductor path over the switching equipment thereto.

28. An arrangement as set forth in claim 27 in which said seizing equipment for said selector switches in the exchange includes line circuits, line finder-selector links connected for access by said line circuits, and register-sender-selector units; and in which said test connection comprises a single conductor path which extends from the register-sender-selector unit and over the seized selector, the calling party line circuit, and the seized link back to the seized register-sender-selector unit.

29. An arrangement as set forth in claim 28 in which the register-sender-selector includes a test circuit, and means for connecting said register-sender-selector to the test circuit responsive to the receipt of all of the impulses representative of the calling party number.

30. In an automatic telephone exchange including a toll ticketing system in which said calling subscriber dials his own directory number for identification purposes; automatic switches operative responsive to receipt of the impulse set representative of the calling party number to extend a connection to his own line including a final selector; a single conductor incoming to said final selector; and means in said selector operative to perform the selector switch selecting functions responsive to seizure thereof over the single conductor, and the receipt of the set of digit representing impulses thereover; means in said selector operative responsive to seizure to mark said single conductor busy to other equipment, and means in the selector operative after selection of the calling line to extend a calling line loop test through the final selector including said single conductor.

31. An arrangement as set forth in claim 30 in which said final selector is connected to have access to at least three hundred subscriber lines.

References Cited in the file of this patent

UNITED STATES PATENTS

| | | |
|---|---|---|
| 638,249 | Keith et al. | Dec. 5, 1889 |
| 1,990,677 | Taylor et al. | Feb. 12, 1935 |